(12) United States Patent
Danek et al.

(10) Patent No.: US 12,471,625 B2
(45) Date of Patent: Nov. 18, 2025

(54) ELECTRONIC DEVICES AND LIQUIDS FOR AEROSOLIZING AND INHALING THEREWITH

(71) Applicant: QNOVIA, INC., Richmond, VA (US)

(72) Inventors: Mario Danek, Los Angeles, CA (US); Christopher Kar-Heng Cheng, Los Angeles, CA (US); Joseph Gene Walsh, Los Angeles, CA (US); Brian Quigley, Richmond, VA (US); Ian Kovacevich, Carlsbad, CA (US); Kassie Betts, San Diego, CA (US)

(73) Assignee: QNOVIA, INC., Irvine, CA (US)

( * ) Notice: Subject to any disclaimer, the term of this patent is extended or adjusted under 35 U.S.C. 154(b) by 429 days.

(21) Appl. No.: 17/518,572

(22) Filed: Nov. 3, 2021

(65) Prior Publication Data
US 2022/0132920 A1 May 5, 2022

Related U.S. Application Data

(63) Continuation-in-part of application No. 17/516,666, filed on Nov. 1, 2021, now abandoned, and a
(Continued)

(51) Int. Cl.
*A24F 40/10* (2020.01)
*A24B 15/167* (2020.01)
(Continued)

(52) U.S. Cl.
CPC ............ *A24F 40/05* (2020.01); *A24B 15/167* (2016.11); *A24F 40/10* (2020.01); *A24F 40/42* (2020.01);
(Continued)

(58) Field of Classification Search
None
See application file for complete search history.

(56) References Cited

U.S. PATENT DOCUMENTS

| 5,322,075 A | 6/1994 | Deevi et al. |
|---|---|---|
| 5,435,282 A | 7/1995 | Haber et al. |

(Continued)

FOREIGN PATENT DOCUMENTS

| CA | 73714 | 12/1993 |
|---|---|---|
| CN | 206043434 U | 3/2017 |

(Continued)

OTHER PUBLICATIONS

Translation of KR20190027650 (Year: 2019).*
(Continued)

*Primary Examiner* — Philip Y Louie
*Assistant Examiner* — Nicole A Szumigalski
(74) *Attorney, Agent, or Firm* — TILLMAN WRIGHT, PLLC; Chad D. Tillman

(57) ABSTRACT

An electronic device includes a mouthpiece, a container (bladder), and a mesh assembly having a mesh material and a piezoelectric material. The mesh material is in contact with a liquid of the bladder. The mouthpiece, the bladder, and the mesh assembly are located in-line along a longitudinal axis of the device between opposite longitudinal ends of the device, with the mesh assembly extending between and separating the mouthpiece and the bladder. A liquid-filled cartridge also is disclosed for use with an electronic device and includes a container (bladder); and a liquid contained within the bladder for aerosolizing and inhaling by a person using the electronic device. The liquid includes an aqueous formulation including a saline component, an acid component, and a nicotine component. The acid component includes a lactic acid. The aqueous formulation optionally
(Continued)

includes one or more of a menthol component, an ethanol component, and a surfactant component.

15 Claims, 33 Drawing Sheets

Related U.S. Application Data continuation-in-part of application No. PCT/US2021/057477, filed on Oct. 30, 2021.

(60) Provisional application No. 63/108,880, filed on Nov. 3, 2020, provisional application No. 63/108,881, filed on Nov. 3, 2020, provisional application No. 63/108,405, filed on Nov. 1, 2020.

(51) Int. Cl.
    *A24F 40/05*     (2020.01)
    *A24F 40/42*     (2020.01)
    *A24F 40/44*     (2020.01)
    *A61M 11/00*     (2006.01)

(52) U.S. Cl.
    CPC ........... *A24F 40/44* (2020.01); *A61M 11/005* (2013.01); *A61M 2205/0294* (2013.01)

(56) References Cited

U.S. PATENT DOCUMENTS

| | | |
|---|---|---|
| 5,510,118 A | 4/1996 | Bosch et al. |
| 5,518,179 A | 5/1996 | Humberstone |
| 5,586,550 A | 12/1996 | Ivri et al. |
| 5,894,841 A | 4/1999 | Voges |
| 5,938,117 A | 8/1999 | Ivri |
| 5,970,974 A | 10/1999 | Van Der Linden et al. |
| 6,138,669 A | 10/2000 | Rocci, Jr. et al. |
| 6,196,218 B1 | 3/2001 | Voges |
| 6,293,474 B1 | 9/2001 | Helf et al. |
| 6,427,682 B1 | 8/2002 | Klimowicz et al. |
| 6,544,542 B1 | 4/2003 | Sonoke et al. |
| 6,748,944 B1 | 6/2004 | DellaVecchia et al. |
| 6,915,962 B2 | 7/2005 | Power et al. |
| 7,013,894 B2 | 3/2006 | McFarland |
| 7,243,648 B2 | 7/2007 | Yang et al. |
| 7,380,729 B2 | 6/2008 | Wendt et al. |
| 7,387,265 B2 | 6/2008 | Hess et al. |
| 7,458,372 B2 | 12/2008 | Feiner et al. |
| 7,470,547 B2 | 12/2008 | Tisone et al. |
| 7,712,466 B2 | 5/2010 | Addington |
| 7,726,306 B2 | 6/2010 | Addington |
| 7,771,642 B2 | 8/2010 | Power et al. |
| 7,832,410 B2 | 11/2010 | Hon |
| 7,861,943 B2 | 1/2011 | Feriani et al. |
| 7,883,031 B2 | 2/2011 | Collins, Jr. |
| 7,934,703 B2 | 5/2011 | Tomono et al. |
| 7,950,595 B2 | 5/2011 | Feriani et al. |
| 8,012,136 B2 | 9/2011 | Collins, Jr. et al. |
| 8,109,266 B2 | 2/2012 | Addington |
| 8,187,554 B2 | 5/2012 | Panagiotou |
| 8,261,739 B2 | 9/2012 | Harris et al. |
| 8,328,115 B2 | 12/2012 | Feriani et al. |
| 8,336,545 B2 | 12/2012 | Fink |
| 8,353,287 B1 | 1/2013 | Hollen et al. |
| 8,418,690 B2 | 4/2013 | Power et al. |
| 8,545,463 B2 | 10/2013 | Collins, Jr. et al. |
| 8,555,874 B2 | 10/2013 | Fink |
| 8,616,195 B2 | 12/2013 | Power |
| 8,684,980 B2 | 4/2014 | Hunter |
| D707,352 S | 6/2014 | Liu et al. |
| 8,794,742 B2 | 8/2014 | Yamaguchi |
| 8,888,548 B2 | 11/2014 | Yi |
| 8,888,925 B2 | 11/2014 | Sato et al. |
| 8,910,625 B2 | 12/2014 | Mullinger |
| 8,936,021 B2 | 1/2015 | Collins, Jr. |
| 9,022,027 B2 | 5/2015 | Addington |
| 9,061,303 B2 | 6/2015 | Waldner et al. |
| 9,168,556 B2 | 10/2015 | Pumm et al. |
| 9,215,895 B2 | 12/2015 | Bowen et al. |
| 9,220,294 B2 | 12/2015 | McCullough |
| 9,260,849 B2 | 2/2016 | Frey et al. |
| 9,339,838 B2 | 5/2016 | Moran |
| 9,352,108 B1 | 5/2016 | Reed et al. |
| 9,358,569 B2 | 6/2016 | Burt |
| 9,380,813 B2 | 7/2016 | McCullough |
| 9,439,455 B2 | 9/2016 | Alarcon |
| 9,533,323 B2 | 1/2017 | Sauzade |
| 9,539,589 B2 | 1/2017 | Araki |
| 9,539,604 B2 | 1/2017 | Wilkerson et al. |
| D779,719 S | 2/2017 | Qiu |
| 9,572,950 B2 | 2/2017 | Power et al. |
| 9,592,524 B2 | 3/2017 | Fritz et al. |
| 9,636,431 B2 | 5/2017 | Teeling et al. |
| 9,718,078 B1 | 8/2017 | Chau et al. |
| 9,744,319 B2 | 8/2017 | Denyer |
| 9,757,528 B2 | 9/2017 | Rubin |
| D799,110 S | 10/2017 | Qiu |
| 9,956,360 B2 | 5/2018 | Germinario |
| 9,962,507 B2 | 5/2018 | Germinario et al. |
| 10,029,053 B2 | 7/2018 | Casey et al. |
| 10,034,494 B2 | 7/2018 | Ampolini |
| 10,076,140 B2 | 9/2018 | Silvestrini |
| 10,080,736 B2 | 9/2018 | Kleidon |
| D830,538 S | 10/2018 | Guillermo et al. |
| D831,822 S | 10/2018 | Guillermo et al. |
| 10,137,261 B2 | 11/2018 | Knudsen |
| D846,796 S | 4/2019 | Pan |
| 10,292,436 B2 | 5/2019 | Cirillo |
| 10,300,228 B2 | 5/2019 | Minskoff |
| D853,632 S | 7/2019 | Qiu et al. |
| 10,334,888 B2 | 7/2019 | Cameron et al. |
| 10,349,674 B2 | 7/2019 | Sur |
| 10,349,676 B2 | 7/2019 | King et al. |
| 10,350,556 B2 | 7/2019 | Xiong |
| 10,412,997 B2 | 9/2019 | Cameron et al. |
| D863,670 S | 10/2019 | He et al. |
| D863,673 S | 10/2019 | Lai |
| 10,449,314 B2 | 10/2019 | Germinario et al. |
| 10,464,095 B2 | 11/2019 | Fritz et al. |
| D870,369 S | 12/2019 | Greenbaum et al. |
| D870,372 S | 12/2019 | Zhu |
| 10,525,220 B2 | 1/2020 | Hunter |
| 10,531,687 B2 | 1/2020 | Liu |
| 10,548,349 B2 | 2/2020 | Sur |
| 10,561,803 B2 | 2/2020 | Liu |
| 10,609,962 B2 | 4/2020 | Zhu |
| 10,617,834 B2 | 4/2020 | Gould |
| 10,632,267 B2 | 4/2020 | Howell |
| D885,655 S | 5/2020 | Ding |
| D885,656 S | 5/2020 | Clough et al. |
| 10,661,036 B2 | 5/2020 | McCullough |
| 10,667,559 B2 | 6/2020 | Bessant |
| 10,737,042 B2 | 8/2020 | Minskoff |
| 10,786,010 B2 | 9/2020 | Hubbard |
| 10,792,455 B2 | 10/2020 | Power et al. |
| 10,821,240 B2 | 11/2020 | McCullough |
| D904,678 S | 12/2020 | Wang et al. |
| D905,329 S | 12/2020 | Wang |
| 10,856,572 B2 | 12/2020 | Sur |
| 10,857,313 B2 | 12/2020 | Fink |
| 10,888,117 B2 | 1/2021 | Danek |
| D909,667 S | 2/2021 | Chen |
| D909,668 S | 2/2021 | Chen |
| D910,233 S | 2/2021 | Grimm et al. |
| 10,918,127 B2 | 2/2021 | Fuisz |
| 11,011,270 B2 | 5/2021 | Hunter et al. |
| 11,027,076 B2 | 6/2021 | Casey et al. |
| 11,027,077 B2 | 6/2021 | Porter et al. |
| 11,039,641 B2 | 6/2021 | Liu |
| 11,077,261 B2 | 8/2021 | Liu |
| 11,131,000 B1 | 9/2021 | Lahoud et al. |
| 11,156,766 B2 | 10/2021 | Novak et al. |
| 11,247,003 B2 | 2/2022 | Rubin |
| 11,253,885 B2 | 2/2022 | Paunescu |

(56) References Cited

U.S. PATENT DOCUMENTS

| | | |
|---|---|---|
| 11,254,979 B2 | 2/2022 | Saleh et al. |
| 11,260,416 B2 | 3/2022 | Wilkerson et al. |
| 11,274,352 B2 | 3/2022 | Lahoud et al. |
| 11,285,274 B2 | 3/2022 | Germinario et al. |
| 11,285,283 B2 | 3/2022 | Germinario et al. |
| 11,285,284 B2 | 3/2022 | Germinario et al. |
| 11,285,285 B2 | 3/2022 | Germinario et al. |
| 11,317,476 B2 | 4/2022 | Schmidt |
| 11,325,149 B2 | 5/2022 | Tan |
| 11,372,153 B2 | 6/2022 | Novak et al. |
| 11,376,380 B2 | 7/2022 | Biette |
| 11,445,574 B2 | 9/2022 | Cameron et al. |
| 11,458,267 B2 | 10/2022 | Hebrank |
| 11,460,631 B2 | 10/2022 | Novak et al. |
| 11,478,019 B2 | 10/2022 | Qiu |
| 11,517,039 B2 | 12/2022 | Cameron et al. |
| 11,517,685 B2 | 12/2022 | Danek |
| 11,529,476 B2 | 12/2022 | Hunter |
| 11,553,730 B2 | 1/2023 | Cameron et al. |
| 11,558,934 B2 | 1/2023 | Ouyang |
| 11,571,022 B2 | 2/2023 | Lahoud et al. |
| 11,589,610 B2 | 2/2023 | Lahoud et al. |
| 11,592,793 B2 | 2/2023 | Novak et al. |
| 11,596,751 B2 | 3/2023 | Potter |
| 11,602,165 B2 | 3/2023 | Lahoud et al. |
| 11,614,720 B2 | 3/2023 | Novak et al. |
| 11,653,152 B1 | 5/2023 | Lahoud |
| 11,654,448 B2 | 5/2023 | Aherne et al. |
| 11,665,483 B1 | 5/2023 | Lahoud |
| 11,666,713 B2 | 6/2023 | Lahoud |
| 11,672,928 B2 | 6/2023 | Lahoud |
| 11,690,963 B2 | 7/2023 | Danek |
| 11,730,191 B2 | 8/2023 | Lahoud |
| 11,730,193 B2 | 8/2023 | Lahoud |
| 11,785,985 B2 | 10/2023 | Lahoud |
| 11,796,732 B2 | 10/2023 | Novak et al. |
| 11,925,207 B2 | 3/2024 | Danek |
| 12,011,535 B2 | 6/2024 | Danek |
| 12,066,654 B2 | 8/2024 | Novak et al. |
| 12,156,547 B2 | 12/2024 | Danek |
| 2003/0068277 A1 | 4/2003 | Vanbever et al. |
| 2004/0204354 A1 | 10/2004 | Nelson et al. |
| 2004/0206351 A1 | 10/2004 | McFarland |
| 2005/0011514 A1 | 1/2005 | Power et al. |
| 2007/0267010 A1 | 11/2007 | Fink et al. |
| 2009/0050142 A1 | 2/2009 | Hamano |
| 2009/0095821 A1 | 4/2009 | Feriani |
| 2010/0044460 A1 | 2/2010 | Sauzade |
| 2010/0044480 A1 | 2/2010 | Lindsey et al. |
| 2010/0166673 A1 | 7/2010 | Surber et al. |
| 2010/0260688 A1 | 10/2010 | Warchol et al. |
| 2011/0108025 A1 | 5/2011 | Fink et al. |
| 2011/0117026 A1 | 5/2011 | Tseng et al. |
| 2011/0168194 A1 | 7/2011 | Hon |
| 2011/0226236 A1 | 9/2011 | Buchberger |
| 2011/0265806 A1 | 11/2011 | Alarcon et al. |
| 2012/0236680 A1 | 9/2012 | Panagiotou et al. |
| 2012/0266870 A1 | 10/2012 | Denyer et al. |
| 2013/0056005 A1 | 3/2013 | Knudsen |
| 2013/0058999 A1 | 3/2013 | Foeger |
| 2013/0079732 A1 | 3/2013 | Burt et al. |
| 2013/0119151 A1 | 5/2013 | Moran et al. |
| 2013/0220315 A1 | 8/2013 | Conley et al. |
| 2013/0238723 A1 | 9/2013 | Balannik et al. |
| 2013/0267864 A1 | 10/2013 | Addington |
| 2013/0269684 A1 | 10/2013 | Patton |
| 2014/0007874 A1 | 1/2014 | Ellwanger et al. |
| 2014/0178461 A1 | 6/2014 | Rigas |
| 2015/0165137 A1 | 6/2015 | Mullinger |
| 2015/0223523 A1 | 8/2015 | McCullough |
| 2015/0238723 A1 | 8/2015 | Knudsen |
| 2015/0257447 A1 | 9/2015 | Sullivan |
| 2016/0001019 A1 | 1/2016 | Fink et al. |
| 2016/0050976 A1 | 2/2016 | Righetti |
| 2016/0051582 A1 | 2/2016 | Li et al. |
| 2016/0192708 A1 | 7/2016 | DeMeritt et al. |
| 2016/0213866 A1 | 7/2016 | Tan |
| 2016/0228658 A1 | 8/2016 | Minskoff |
| 2016/0338407 A1 | 11/2016 | Kerdemelidis |
| 2016/0374397 A1 | 12/2016 | Jordan et al. |
| 2017/0095002 A1 | 4/2017 | Silvestrini |
| 2017/0119059 A1 | 5/2017 | Zuber et al. |
| 2017/0143627 A1 | 5/2017 | Misra |
| 2017/0172977 A1 | 6/2017 | Kleidon et al. |
| 2017/0273914 A1 | 9/2017 | Knudsen |
| 2017/0281701 A1 | 10/2017 | Kan |
| 2017/0368273 A1 | 12/2017 | Rubin |
| 2018/0043114 A1 | 2/2018 | Bowen et al. |
| 2018/0043115 A1 | 2/2018 | Gould et al. |
| 2018/0051002 A1 | 2/2018 | Dull et al. |
| 2018/0146710 A1 | 5/2018 | Bessant et al. |
| 2018/0153217 A1 | 6/2018 | Liu et al. |
| 2018/0161525 A1 | 6/2018 | Liu et al. |
| 2018/0220707 A1* | 8/2018 | Biel ................. A24F 40/40 |
| 2018/0279667 A1 | 10/2018 | McAdam et al. |
| 2018/0289907 A1 | 10/2018 | Marmur et al. |
| 2018/0296493 A1 | 10/2018 | Kaufman |
| 2018/0360116 A1 | 12/2018 | Schmidt et al. |
| 2019/0008208 A1 | 1/2019 | Cirillo et al. |
| 2019/0014819 A1 | 1/2019 | Sur |
| 2019/0045834 A1 | 2/2019 | Fuisz et al. |
| 2019/0046436 A1 | 2/2019 | Hazani et al. |
| 2019/0124992 A1 | 5/2019 | Nakano |
| 2019/0150519 A1 | 5/2019 | Liu et al. |
| 2019/0174826 A1 | 6/2019 | Zhu |
| 2019/0183177 A1 | 6/2019 | Hubbard et al. |
| 2019/0247607 A1 | 8/2019 | Knudsen |
| 2019/0282502 A1 | 9/2019 | Boeckl et al. |
| 2019/0289911 A1 | 9/2019 | Liu |
| 2019/0299171 A1 | 10/2019 | Xiong et al. |
| 2019/0364957 A1 | 12/2019 | Fu et al. |
| 2020/0060338 A1 | 2/2020 | Danek |
| 2020/0060349 A1 | 2/2020 | Danek |
| 2020/0077704 A1 | 3/2020 | Ouyang |
| 2020/0120989 A1 | 4/2020 | Danek |
| 2020/0154765 A1* | 5/2020 | Lee ................. A24F 40/50 |
| 2020/0155786 A1 | 5/2020 | Power et al. |
| 2020/0230329 A1 | 7/2020 | Danek |
| 2020/0237007 A1 | 7/2020 | Qiu et al. |
| 2020/0245692 A1* | 8/2020 | Cameron ............ B05B 17/0684 |
| 2020/0261439 A1* | 8/2020 | Pell ................. A24B 15/167 |
| 2020/0276398 A1 | 9/2020 | Hebrank |
| 2020/0281250 A1* | 9/2020 | Dull ................. A24B 15/167 |
| 2020/0289770 A1 | 9/2020 | Hebrank |
| 2020/0353186 A1 | 11/2020 | Hebrank et al. |
| 2020/0367553 A1 | 11/2020 | Hejazi |
| 2020/0405995 A1 | 12/2020 | Power et al. |
| 2021/0001381 A1 | 1/2021 | Qiu |
| 2021/0052014 A1 | 2/2021 | Hejazi |
| 2021/0076734 A1 | 3/2021 | Minami et al. |
| 2021/0084970 A1* | 3/2021 | Hejazi ............... A61M 15/0003 |
| 2021/0106772 A1 | 4/2021 | Hebrank |
| 2021/0112882 A1 | 4/2021 | Hejazi |
| 2021/0113783 A1 | 4/2021 | Danek et al. |
| 2021/0121908 A1 | 4/2021 | Sidawi et al. |
| 2021/0177055 A1 | 6/2021 | Lahoud |
| 2021/0178090 A1 | 6/2021 | Lahoud et al. |
| 2021/0195947 A1 | 7/2021 | Lahoud |
| 2021/0195950 A1* | 7/2021 | Johnson ............. A24F 40/40 |
| 2021/0212370 A1 | 7/2021 | Moloney et al. |
| 2021/0260312 A1 | 8/2021 | Lacour-gayet et al. |
| 2021/0275760 A1 | 9/2021 | Hunter |
| 2021/0282465 A1 | 9/2021 | Cristian |
| 2021/0283345 A1 | 9/2021 | Porter et al. |
| 2021/0307376 A1 | 10/2021 | Lahoud et al. |
| 2021/0310913 A1 | 10/2021 | Lahoud et al. |
| 2021/0361889 A1 | 11/2021 | Selby et al. |
| 2021/0402114 A1 | 12/2021 | Lahoud |
| 2021/0404594 A1 | 12/2021 | Hanson et al. |
| 2022/0001121 A1 | 1/2022 | Lahoud |
| 2022/0001122 A1 | 1/2022 | Hunter |
| 2022/0031975 A1 | 2/2022 | Selby et al. |
| 2022/0040418 A1 | 2/2022 | Blick et al. |
| 2022/0040423 A1 | 2/2022 | Marmur |

(56) References Cited

U.S. PATENT DOCUMENTS

| | | |
|---|---|---|
| 2022/0047818 A1 | 2/2022 | Reinhart et al. |
| 2022/0062565 A1 | 3/2022 | Reinhart et al. |
| 2022/0062942 A1 | 3/2022 | Greenenko et al. |
| 2022/0072182 A1 | 3/2022 | Freeman |
| 2022/0072578 A1 | 3/2022 | Meacham et al. |
| 2022/0080137 A1 | 3/2022 | Hebrank |
| 2022/0105284 A1 | 4/2022 | Lahoud et al. |
| 2022/0110362 A1 | 4/2022 | Lahoud et al. |
| 2022/0132935 A1 | 5/2022 | Lahoud |
| 2022/0175036 A1 | 6/2022 | Hazani et al. |
| 2022/0218020 A1 | 7/2022 | Lahoud et al. |
| 2022/0218863 A1 | 7/2022 | Edwards et al. |
| 2022/0218921 A1 | 7/2022 | Lahoud et al. |
| 2022/0218922 A1 | 7/2022 | Lahoud et al. |
| 2022/0218923 A1 | 7/2022 | Lahoud et al. |
| 2022/0225664 A1 | 7/2022 | Lahoud et al. |
| 2022/0226587 A1 | 7/2022 | Hunter |
| 2022/0226856 A1 | 7/2022 | Anzenberger et al. |
| 2022/0243289 A1 | 8/2022 | Lahoud et al. |
| 2022/0296823 A1 | 9/2022 | Lahoud et al. |
| 2022/0338535 A1 | 10/2022 | Danek |
| 2022/0361564 A1 | 11/2022 | Lahoud et al. |
| 2022/0361565 A1 | 11/2022 | Lahoud et al. |
| 2022/0361567 A1 | 11/2022 | Lahoud et al. |
| 2022/0362490 A1 | 11/2022 | Lahoud et al. |
| 2022/0362494 A1 | 11/2022 | Lahoud et al. |
| 2022/0369698 A1 | 11/2022 | Lahoud et al. |
| 2022/0369699 A1 | 11/2022 | Lahoud et al. |
| 2022/0370737 A1 | 11/2022 | Lahoud et al. |
| 2022/0370739 A1 | 11/2022 | Lahoud |
| 2022/0370740 A1 | 11/2022 | Lahoud et al. |
| 2022/0400745 A1 | 12/2022 | Lahoud |
| 2022/0400746 A1 | 12/2022 | Lahoud |
| 2023/0001107 A1 | 1/2023 | Connolly et al. |
| 2023/0028847 A1 | 1/2023 | Lee et al. |
| 2023/0118045 A1 | 4/2023 | Danek et al. |
| 2023/0121005 A1 | 4/2023 | Danek et al. |
| 2023/0157360 A1* | 5/2023 | Zhou .................. A24F 40/485 131/329 |
| 2023/0166284 A1 | 6/2023 | Aherne et al. |
| 2023/0337735 A1 | 10/2023 | Danek |
| 2025/0089765 A1 | 3/2025 | Danek et al. |

FOREIGN PATENT DOCUMENTS

| | | | |
|---|---|---|---|
| CN | 201830669506.0 | 9/2019 | |
| CN | 2020030081539.0 | 9/2020 | |
| EP | 0002234 A1 | 6/1979 | |
| EP | 0718046 A2 | 6/1996 | |
| EP | 1154815 | 7/2004 | |
| EP | 1688146 A1 | 8/2006 | |
| EP | 2886185 A1 | 6/2015 | |
| EP | 2523710 B1 | 10/2015 | |
| EP | 3228345 | 10/2017 | |
| EP | 3298912 A1 | 3/2018 | |
| EP | 3469929 A1 | 12/2019 | |
| FR | 3064490 A1 | 10/2018 | |
| GB | 2524856 A | 10/2015 | |
| GB | 6010917 | 4/2017 | |
| GB | 2570439 A | 7/2019 | |
| KR | 1020100097807 A | 9/2010 | |
| KR | 1020050023256 | 9/2012 | |
| KR | 1020120104964 | 9/2012 | |
| KR | 3020120036331 | 10/2013 | |
| KR | 20190027650 A * | 3/2019 | ........... A24F 47/008 |
| WO | 1993010910 A1 | 6/1993 | |
| WO | 200050111 A1 | 8/2000 | |
| WO | 2013007537 A2 | 1/2013 | |
| WO | 2014167515 A1 | 10/2014 | |
| WO | 2016019353 A1 | 2/2016 | |
| WO | 2016076178 A1 | 5/2016 | |
| WO | WO-2017076590 A1 * | 5/2017 | ............. A24F 40/05 |
| WO | 2017108394 | 6/2017 | |
| WO | 2017149165 A1 | 9/2017 | |
| WO | 2017175218 A2 | 10/2017 | |
| WO | 2017183011 A1 | 10/2017 | |
| WO | 2018002926 A1 | 1/2018 | |
| WO | WO-2019101946 A1 * | 5/2019 | ........... A24F 40/485 |
| WO | 2019239217 A1 | 12/2019 | |
| WO | 2020227717 | 11/2020 | |
| WO | WO-2021143188 A1 * | 7/2021 | ............. A24F 40/10 |
| WO | 2021203038 A1 | 10/2021 | |
| WO | 2022/051496 | 3/2022 | |
| WO | 2022/079037 | 4/2022 | |
| WO | 2022/096589 | 5/2022 | |
| WO | 2022094358 A1 | 5/2022 | |
| WO | 2022098802 A1 | 5/2022 | |
| WO | 2022/129906 | 6/2022 | |
| WO | 2022/179854 | 9/2022 | |
| WO | 2022/200151 | 9/2022 | |
| WO | 2023111495 A1 | 6/2023 | |
| WO | 2023111496 A1 | 6/2023 | |

OTHER PUBLICATIONS

"Innokin Adept: Unboxing Experience" (Kai's Virgin Vapor), Jul. 27, 2021, retrieved from https://web.archive.org/web/20210727211502/ https://www.kaisvirginvapor.com/pages/innokin-adept-unboxing-experience.

"Biocompatibility of Medicinal Product Medical Device Combination for Airway Delivery" (Turner), May 17, 2021, retrieved from https://ondrugdelivery.com/biocompatibility-of-medicinal-product-medical-device-combinations-for-airway-delivery.

Laouini et al., Characterization of different vitamin E carriers intended for pulmonary drug delivery, International Journal of Pharmaceutics, Jun. 2, 2014, pp. 285-290, vol. 471, Elsevier B.V., Tours Cedex, France.

Peshkovsky, Ways to Consume Cannabis: How Water-Compatible Nanoemulsions Can Help, Sonomechanics Blog, accessed at https://blog.sonomechanics.com/blog/ways-to-consume-cannabis-how-nanoemulsions-can-help, Mar. 16, 2023, Industrial Sonomechanics, LLC, Miami, Florida.

Uchiyama et al. "Determination of Chemical Compounds Generated from Second-generation E-cigarettes Using a Sorbent Cartridge Followed by a Two-step Elution Method", Analytical Sciences, vol. 32, pp. 549-556, May 2016. (8 pages).

Caly et al., "The FDA-approved drug ivermectin inhibits the replication of SARS-CoV-2 in vitro". Antiviral Research 178 (2020) 104787, www.elsevier.com/locate/antiviral (4 pages).

Farsalinos et al. "Carbonyl Emission in E-cigarette Aerosol: A Systematic Review and Methodological Considerations", Frontiers in Physiology, vol. 8, Article 1119, Jan. 11, 2018, pp. 1-14. (14 pages).

Carugo et al., "Liposome production by microfluidics: potential and limiting factors". Scientific Reports, received: Dec. 15, 2015, accepted: Apr. 22, 2016, Published: May 19, 2016. www.nature.com/scientificreports (15 pages).

Geiss et al. "Correlation of volatile carbonyl yields emitted by e-cigarettes with the temperature of the heating coil and the perceived sensorial quality of the generated vapours", International Journal of Hygiene and Environmental Health, vol. 219, pp. 268-277. (10 pages), 2016.

Duell et al., "Nicotine in tobacco products aerosols: It's deja vu all over again". Duell AK, Pankow JF, Peyton DH. Tob Control 2020;29:656-662. <https:// dx. doi. org/ 10. 1136/tobaccocontrol-2019- 055275> (7 pages), 2019.

Herrington et al. "Electronic cigarette solutions and resultant aerosol profiles", Journal of Chromatography A, vol. 1418, pp. 192-199, 2015. (8 pages).

Gillman et al. "Effect of variable power levels on the yield of total aerosol mass and formation of aldehydes in ecigarette aerosols", Regulatory Toxicology and Pharmacology, vol. 75, 2016, pp. 58-65. (8 pages).

European patent application 16163666 submitted as priority document in PCT/IL2017/050402, made publicly available by WIPO through publication of the international application on Oct. 12, 2017, 22 pages.

(56) References Cited

OTHER PUBLICATIONS

European patent application 16176635 submitted as priority document in PCT/IL2017/050402, made publicly available by WIPO through publication of the international application on Oct. 12, 2017, 31 pages.
European patent application 16187618 submitted as priority document in PCT/IL2017/050402, made publicly available by WIPO through publication of the international application on Oct. 12, 2017, 51 pages.
European patent application 17155046 submitted as priority document in PCT/IL2017/050402, made publicly available by WIPO through publication of the international application on Oct. 12, 2017, 87 pages.
Swain et al. "Excipients and its Variation in Pharmaceutical Aerosol Formulation: A Review", Innovat Internation Journal of Medical & Pharmaceutical Sciences, vol. 1(1), 2016, pp. 4-8. (5 pages).
Green et al. "Pharmaceutical Aerosols—Enhancing the Metered Dose Inhaler", DuPont Central Research & Development. (10 pages).
Klager et al. "Flavoring Chemicals and Aldehydes in E-Cigarette Emissions", Environmental Science & Technology, vol. 51, pp. 10806-10813. (8 pages), 2019.
Gardenhire et al., "A Guide to Aerosol Delivery Devices for Respiratory Therapists", American Association for Respiratory Care, 4th Edition, (61 pages), 2017.
Wang et al. "A Device-Independent Evaluation of Carbonyl Emission from Heated Electronic Cigarette Solvents", PLOS ONE | DOI:10.1371/journal.pone.0169811, Jan. 11, 2017, pp. 1-14. (14 pages).
Jensen et al. "Hidden Formaldehyde in E-Cigarette Aerosols", New England Journal of Medicine, Jan. 2015. (7 pages).
Jensen et al. "Hidden Formaldehyde in E-Cigarette Aerosols", Supplementary Appendix, New England Journal of Medicine, Jan. 2015. (3 pages).
"Introducing the G Pen Elite Vaporizer". By GPEN. Dated Mar. 10, 2016, found online [Dec. 8, 2020]. https://.www.gpen.com/blogs/news/112895044-introductin-the-g-pen-elite-vaproizer, Year: 2016, (2 pages).
"International Search Report" and "Written Opinion of the International Search Authority" (ISA/US) in Respira Technologies, Inc, International Patent Application Serial No. PCT/US2021/057963, dated Apr. 14, 2022 (10 pages).
"International Search Report" and "Written Opinion of the International Search Authority" (ISA/US) in Respira Technologies, Inc, International Patent Application Serial No. PCT/US2021/057477, dated Mar. 16, 2022 (11 pages).
"International Search Report" and "Written Opinion of the International Search Authority" (ISA/US) in Respira Technologies, Inc, International Patent Application Serial No. PCT/US2020/056540, dated Feb. 9, 2021 (49 pages).
"International Search Report" and "Written Opinion of the International Search Authority" (ISA/US) in Respira Technologies, Inc, International Patent Application Serial No. PCT/US2020/056541, dated Jan. 12, 2021 (12 pages).
Borders, Brett, "What is Nanoemulsified CBD?", Aug. 8, 2018, http://brettborders.net/what-is-nanoemulsifiedcbd-oil., Aug. 8, 2018, (9 pages).
Hawkins et al. "Vibrating Mesh Nebulizer Reference Design", Microchip Technology Inc., AN2265. 2016-2017. (50 pages).
Ari. "Jet, Ultrasonic, and Mesh Nebulizers: An Evaluation of Nebulizers for Better Clinical Outcomes", Georgia State University, Respiratory Therapy Faculty Publications, Department of Respiratory Therapy, Eurasian J Pulmonol 2014; 16: 1-7, pp. 1-7. (8 pages).
Weir. "Juul users inhaling chemicals not listed". YaleNews, Jul. 30, 2019. (3 pages).
Rudokas et al. "Liposome Delivery Systems for Inhalation: A Critical Review Highlighting Formulation Issues and Anticancer Applications", Medical Principles and Practice, 2016;25(suppl 2), pp. 60-72, 2016. (13 pages).
Akbarzadeh et al. "Liposome: classification, preparation, and applications", Nanoscale Researh Letters, Nano Review, vol. 8:102. (9 pages), 2013.
Vecellio. "The mesh nebuliser: a recent technical innovation for aerosol delivery", Breathe, vol. 2, pp. 252-260, Mar. 2006, (9 pages).
Prichard et al. "Mesh nebulizers have become the first choice for new nebulized pharmaceutical drug developments", Therapeudic Delivery, vol. 9(2), Oct. 17, 2017, pp. 121-136. (16 pages).
Microfluidics "Microfluidizer Processor User Guide. Innovation Through Microfluidizer Processor Technology" Dec. 2014. (10 pages).
Millquist et al., "Inhalation of menthol reduces capsaicin cough sensitivity and influences inspiratory flows in chronic cough." Respiratory Medicine (2013) 107, pp. 433-438, (7 pages).
Naqui et al. "Povidon-iodine solution as SARS-CoV2 prophylaxis for procedures of the upper aerodigestive tract a theroetical framework". Journal of Otolaryngology—Head & Neck Surgery (2020), (4 pages).
Sahiti et al. "Nebulizers: A Review Paper", International Journal of Advanced Research in Computer Science, vol. 8, No.5, May-Jun. 2017 ISSN No. 0976-5697, pp. 1697-1699. (3 pages).
El-Hellani et al. "Nicotine and Carbonyl Emissions From Popular Electronic Cigarette Products: Correlation to Liquid Composition and Design Characteicstics", Nicotine & Tobacco Research, 2018, 215-223 doi:10.1093/ntr/ntw280/, pp. 216-223. (9 pages).
Omron Mesh Nebulizer Micro Air U100 (NE-U100-E) Instruction Manual, Nov. 2017. (32 pages).
Philips InnoSpire Go—Portable Mesh Nebulizer, Highlights and Specifications, HH1342/00, version 5.0.1, Dec. 12, 2017. (2 pages).
Respira "Wave" Execs say they Created a Healthier Vape. by Cheddar. Dated Nov. 19, 2019, found online [Dec. 8, 2020]. https://cheddar.com/media/respira-wave-execs-say-they-created-a-healthier-vape Year 2019. (1 page).
"Respira to Submit Nebulizer for FDA Approval.", by tobaccoreporter, dated Jun. 17, 2020, found online [Dec. 8, 2020]. https://tobaccoreporter.com/2020/06/17/respira-to-submit-nebulizer-for-fda-approval/ Year 2020. (2 pages).
Review: Loki Touch Vaporizer, by vaporplants,dated Jan. 12, 2017, found online [Dec. 8, 2020]. https://www.vaporplants.com/review-loki-touch-vaporizer Year 2017. (2 pages).
Rosbrook, K, "Sensory Effects of Menthol and Nicotine in an E-Cigarette" Nicotine & Tobacco Research—Jan. 2016, pp. 1588-1596. https://www.researchgate.net/publication/291206387, (9 pages).
Olszewski et al. "A silicon-based MEMS vibrating mesh nebulizer for inhaled drug delivery", ScienceDirect, Procedia Engineering, vol. 168, pp. 1521-1524. (5 pages), 2016.
Stathis et al., "Review of the use of nasal and oral antiseptics during a global pandemic." Future Microbiology (2021) 12(2), pp. 119-130, (12 pages).

* cited by examiner

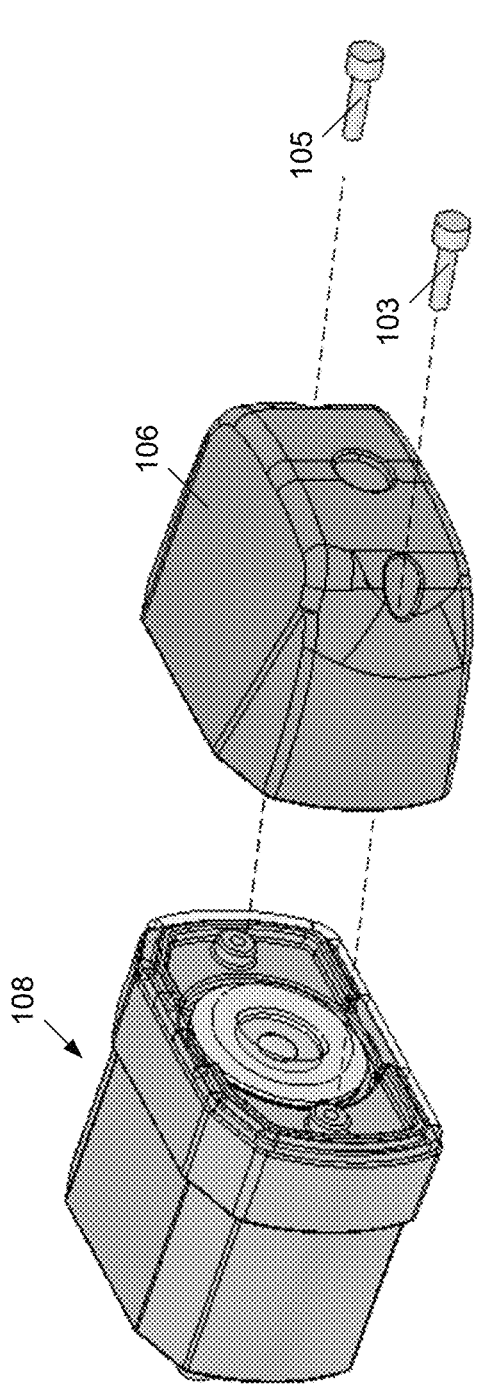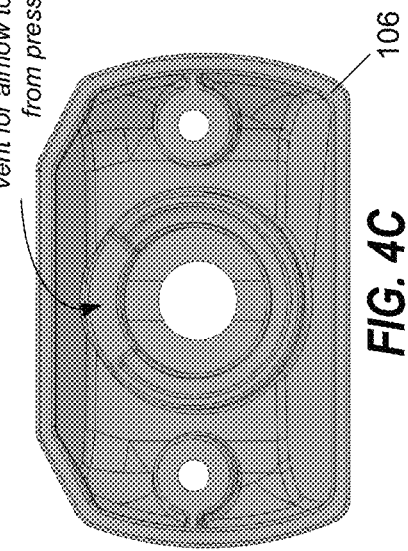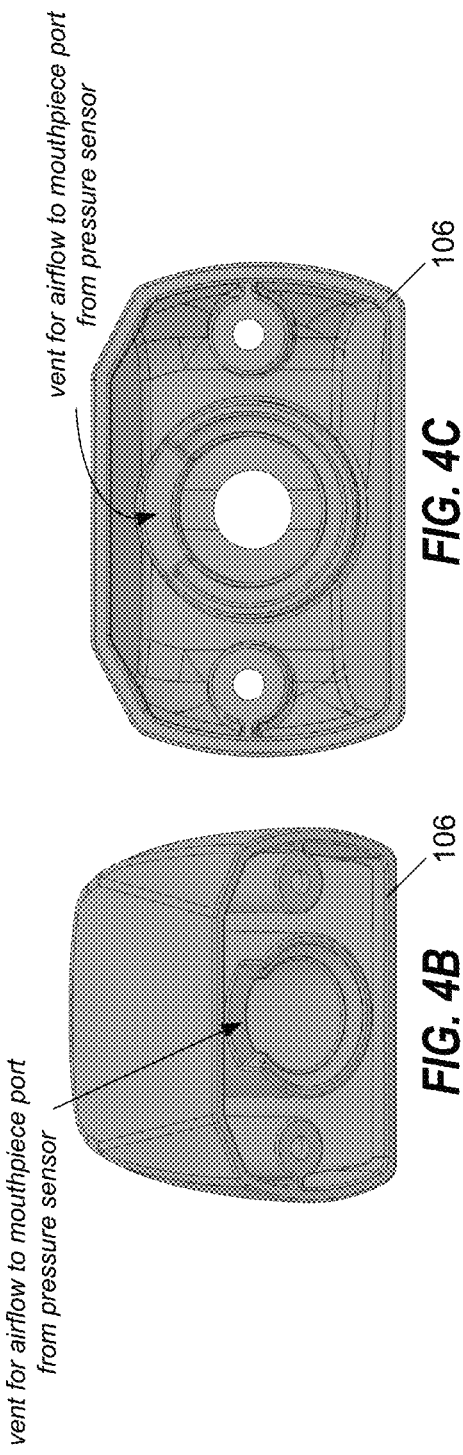
FIG. 4A
FIG. 4C
FIG. 4B

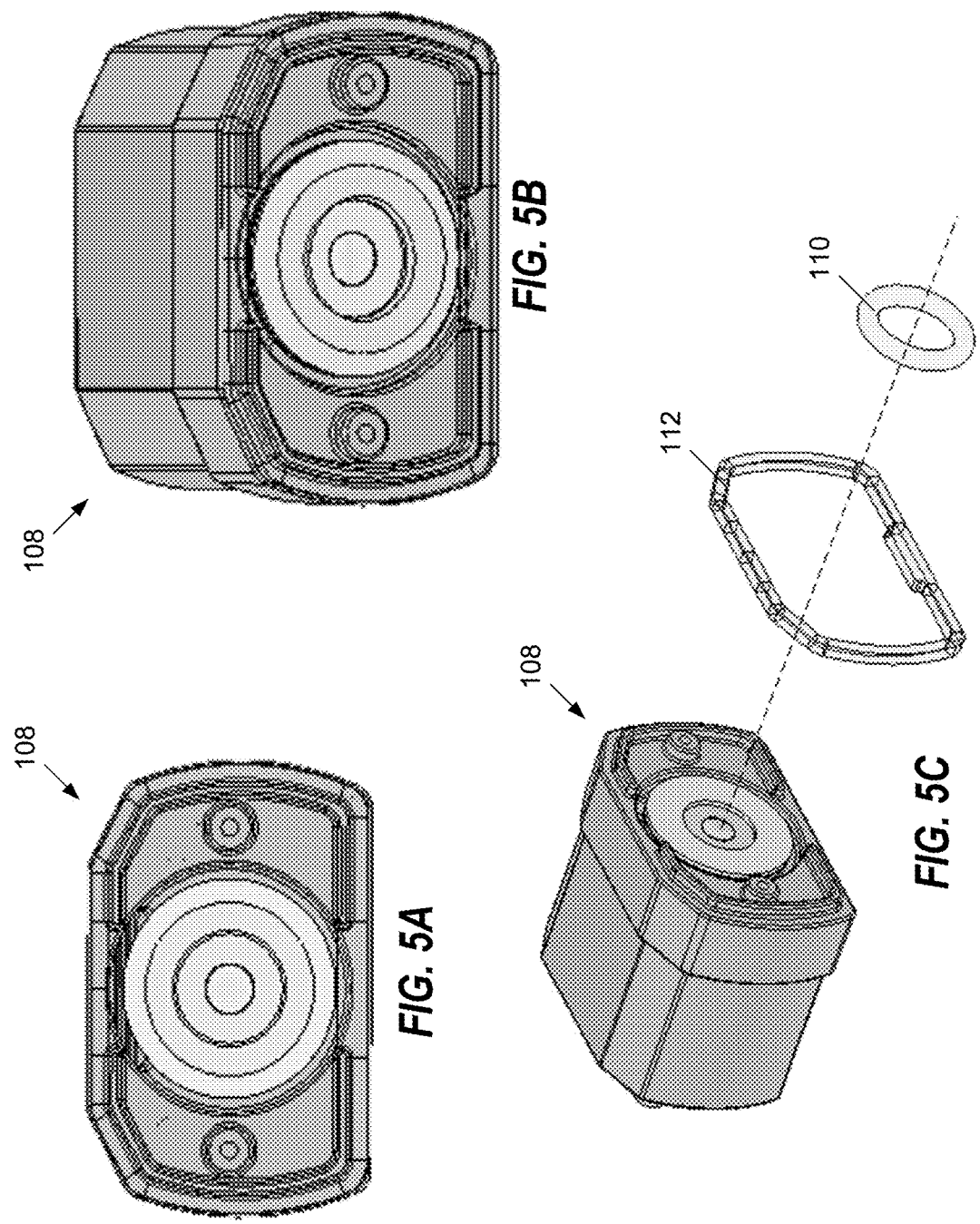

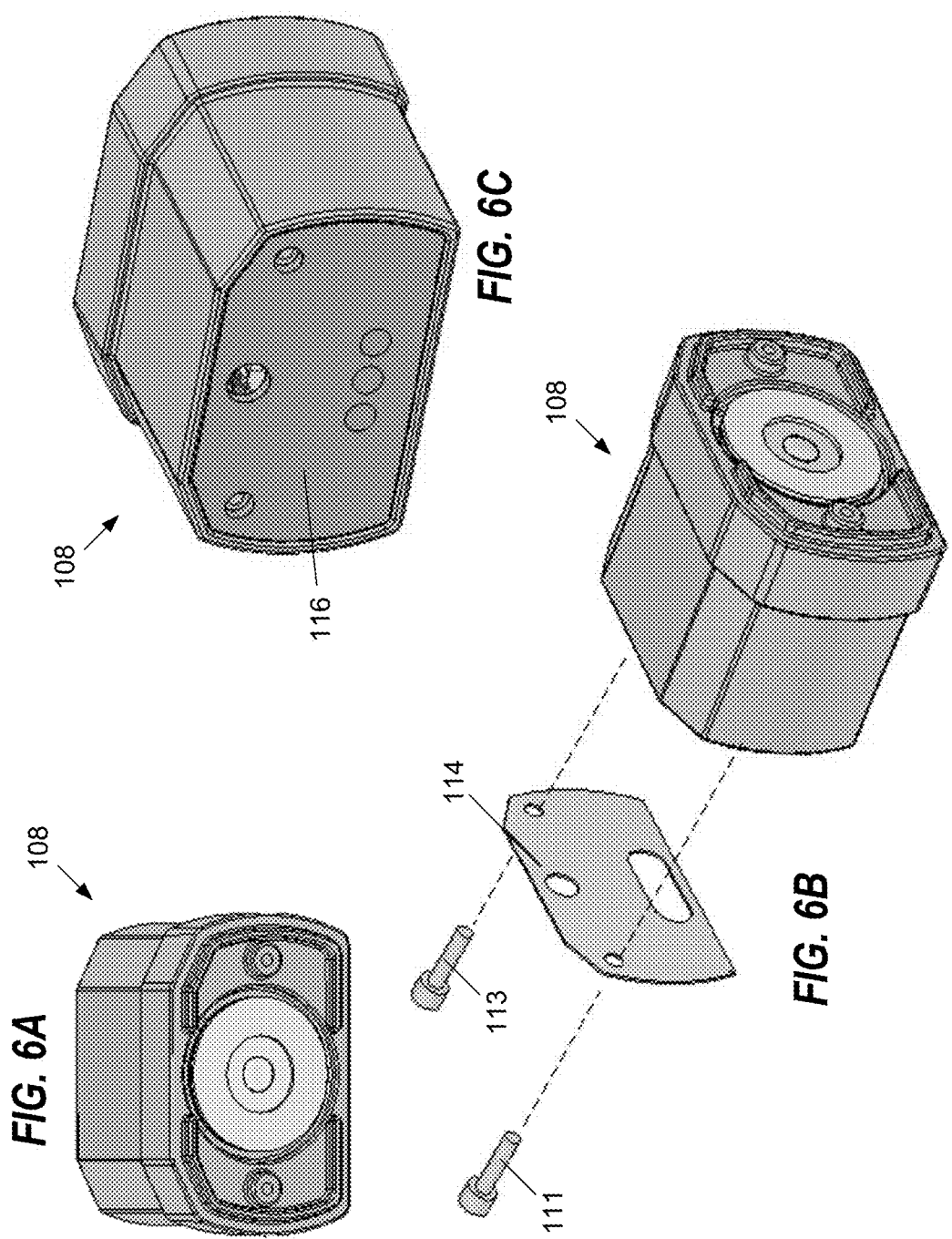

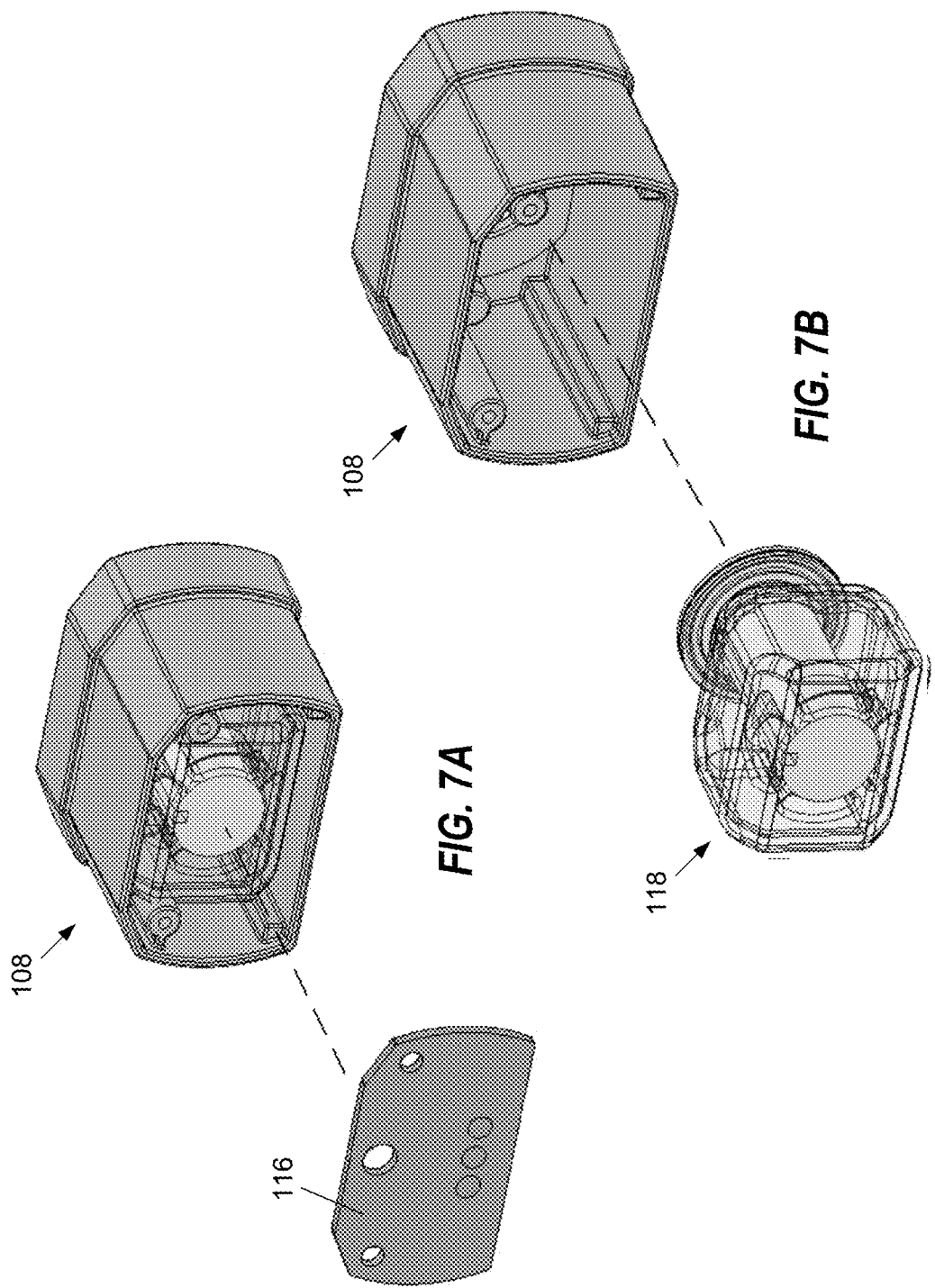

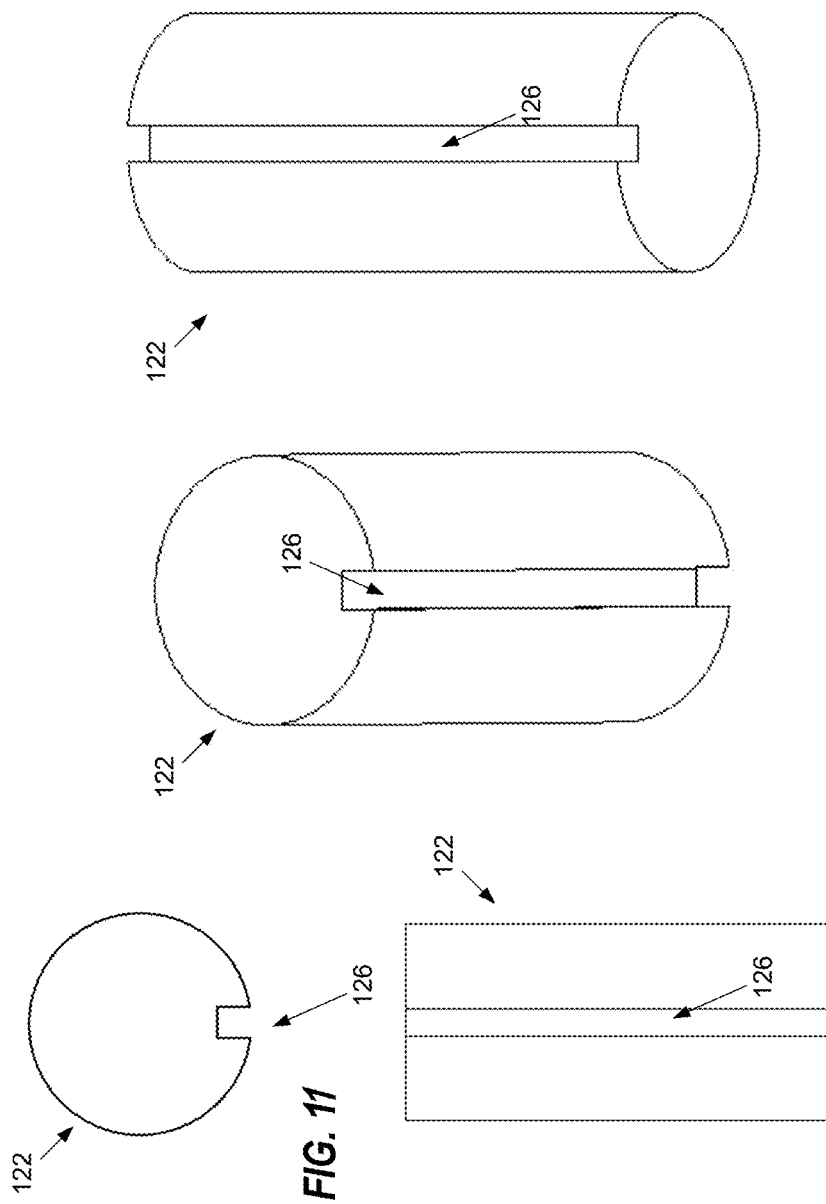

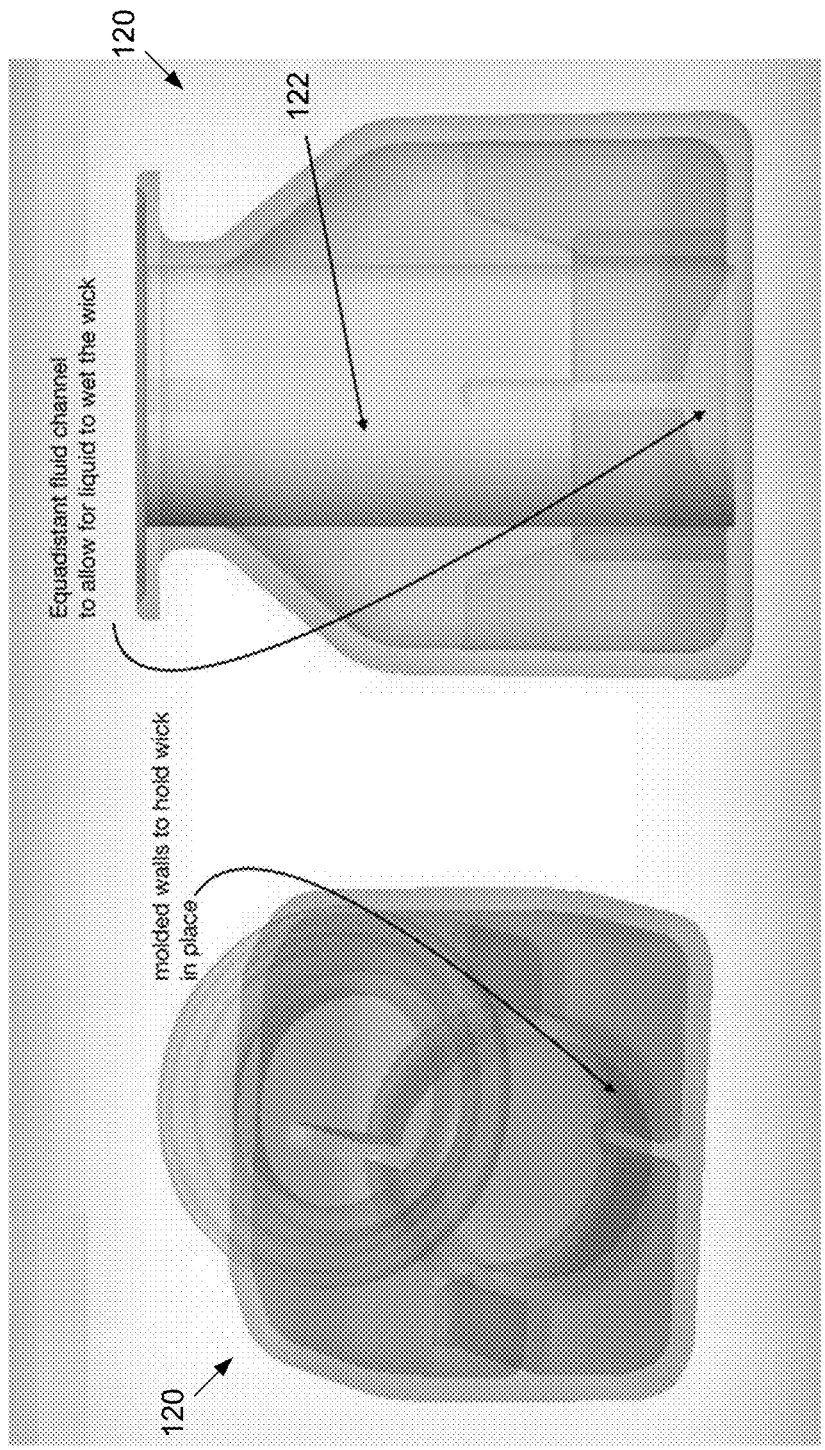

FIG. 19A — Pressure sensor for actuation by inhalation of use via mouthpiece

FIG. 19B — Pressure sensor for actuabion by inhalation of use via mouthpiece

ELECTRONIC DEVICES AND LIQUIDS FOR AEROSOLIZING AND INHALING THEREWITH

CROSS-REFERENCE TO APPLICATIONS

This application hereby incorporates by reference Applicant's U.S. patent application Ser. No. 17/075,679 ("the '679 application"); U.S. patent application publication 2021/0113783 A1 representing the publication thereof; and any U.S. patent issuing therefrom. This application further hereby incorporates by reference the disclosure of each patent application from which priority is claimed, any U.S. patent application publications thereof, and any U.S. patents issuing therefrom. Aspects and features of the invention are believed to be improvements and enhancements over the devices and methods disclosed in the '679 application.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the USPTO's electronic filing system, and hereby incorporated herein by reference, is a computer program listing appendix representing computer program files including instructions, routines, and/or other contents of several computer programs. A table setting forth the name and size of files included in the computer program listing appendix is included below.

| File Name | Creation Date | File Size (bytes) |
| --- | --- | --- |
| ascify.txt | Oct. 20, 2019 20:33 | 37,473 |
| readme.txt | Oct. 20, 2019 11:55 | 2,579 |
| cad.txt | Nov. 1, 2020 21:33:00 | 1,872,438 |

One of these files, "readme.txt", contains instructions for extracting information from "cad.txt", which file represents a compressed binary file that has been converted to ascii format. This file can be converted back to a compressed .zip archive utilizing an assembly conversion program, source code for which is contained in "ascify.txt". The "readme.txt" file includes instructions for compiling and running this conversion program, and instructions for converting the other text file to a compressed, binary file.

This compressed, binary file includes an interactive PDF file for a three-dimensional rendering of a commercial prototype electronic device for aerosolizing and inhaling an aqueous liquid, which illustrates aspects and features in accordance with one or more preferred embodiments of the invention. This PDF file is compatible with Adobe Acrobat 2020 and the current release of Adobe Acrobat DC running in Microsoft Windows on a PC or Mac.

BACKGROUND OF THE INVENTION

The invention generally relates to apparatus, systems, and methods for producing an aerosol for inhalation by a person, whether intended for personal or recreational use, or for the administration of medicines.

Vaping has been rapidly increasing in popularity, primarily because vaping provides a convenient, discreet, and presumably benign way to self-administer nicotine, cannabis, drugs, or other micronutrients. Indeed, there is a common belief that vaping is healthier than smoking cigarettes; vaping purportedly lets smokers avoid dangerous chemicals inhaled from regular cigarettes while still getting nicotine. Vaping also can be used for cannabis.

Vaping is performed using a vaporizer. A vaporizer includes a vape pen or a cigarette style vape, referred to by many as an e-cigarette or "eCig". A vape pen generally is an elongate, thin, and stylized tube that resembles a fancy pen. In contrast, an e-cigarette resembles an actual cigarette. The e-cigarette is usually small in size (usually smaller and more discreet than vape pens), easily portable, and easy to use.

A common vaporizer comprises a container, which may be a tank—which is typically refillable, or a cartridge—which is typically single-use and not refillable. The tank or cartridge holds a liquid often referred to as an e-liquid or e-juice. Tanks typically are made out of polycarbonate plastic, glass, or stainless steel. The vaporizer also includes a mouthpiece for inhaling by a person through the mouth; an atomizer comprising a tiny heating element that converts the liquid into tiny, airborne droplets that are inhaled; and a controller for turning on the atomizer. Many vape pens are mouth-activated and turn on automatically when a person inhales. Others vape pins are button activated and require the person to push a button to activate the atomizer. Vaporizers are electrically powered using one or more batteries. The batteries typically are lithium ion batteries that are rechargeable and primarily are used to heat the heating element of the atomizer. A charger usually accompanies a vaporizer when purchased for charging the batteries. The charger may be a USB charger, car charger, or wall charger, and such chargers are generally similar to phone chargers.

The battery-powered vaporizer produces vapor from any of a variety of liquids and liquid mixtures, especially those containing nicotine or cannabinoids. Many diverse types and flavors are available. Moreover, the liquids can be non-medicated (i.e., containing no nicotine or other substances—just pure vegetable glycerin and flavoring), or the liquids can contain nicotine or even in some instances if and where legal, the liquids can contain THC/CBD. The liquids also may contain one or more of a variety of flavors as well as micronutrients such as, for example, vitamin B12. A person can mix the liquids for use with a vape pen. Vaporizers typically are purchased with prefilled cartridges. The heating element turns the contents of the liquids into an aerosol—the vapor—that is inhaled into the lungs and then exhaled by the person. Perhaps one of the most popular vaporizers today is known as the "JUUL", which is a small, sleek device that resembles a computer USB flash drive.

It is believed that, while promoted as healthier than traditional cigarette use, vaping actually may be more dangerous. Propylene glycol, vegetable glycerin and combinations or methylations thereof, are chemicals that are often mixed with nicotine, cannabis, or hemp oil for use in vaporizers. Propylene glycol is the primary ingredient in a majority of nicotine-infused e-cigarette liquids. Unfortunately, at high temperatures propylene glycol converts into tiny polymers that can wreak havoc on lung tissue. In particular, scientists know a great deal about propylene glycol. It is found in a plethora of common household items—cosmetics, baby wipes, pharmaceuticals, pet food, antifreeze, etc. The U.S. Food and Drug Administration and Health Canada have deemed propylene glycol safe for human ingestion and topical application. But exposure by inhalation is another matter. Many things are safe to eat but dangerous to breathe. Because of low oral toxicity, propylene glycol is classified by the FDA as "generally recognized as safe" (GRAS) for use as a food additive, but this assessment was based on toxicity studies that did not involve heating and breathing propylene glycol. Indeed, a 2010 study published in the International Journal of Environmental Research and Public Health concluded that airborne propylene glycol circulating indoors can induce or exacerbate asthma, eczema, and many allergic symptoms. Children were said to be particularly sensitive to these airborne toxins. An earlier toxicology review warned that propylene glycol, ubiquitous in hairsprays, could be harmful because aerosol particles lodge deep in the lungs and are not respirable.

Moreover, when propylene glycol is heated, whether by a red-hot metal coil of a heating element of a vaporizer or otherwise, the potential harm from inhalation exposure increases. It is believed that high voltage heat transforms the propylene glycol and other vaping additives into carbonyls. Carbonyls are a group of cancer-causing chemicals that includes formaldehyde, which has been linked to spontaneous abortions and low birth weight. A known thermal breakdown product of propylene glycol, formaldehyde is an International Agency for Research on Cancer group 1 carcinogen!

Prevalent in nicotine e-cigarette products and present in some vape oil cartridges, FDA-approved flavoring agents pose additional risks when inhaled rather than eaten. The flavoring compounds smooth and creamy (diacetyl and acetyl propionyl) are associated with respiratory illness when inhaled in tobacco e-cigarette devices. Another hazardous-when-inhaled-but-safe-to-eat flavoring compound is Ceylon cinnamon, which becomes cytotoxic when aerosolized.

When a heating element gets red hot in a vaporizer, the liquid undergoes a process called "smoldering", which is a technical term for what is tantamount to "burning"; while much of the liquid is vaporized and atomized, a portion of the liquid undergoes pyrolysis or combustion. In that sense, most of the vaporizers that have flooded the commercial market may not be true vaporizers.

It thus will be appreciated that as inhalation delivery systems using heating have increased in prominence, concerns about their short and long term safety have come into focus. This is particularly true for vaping where there exist ongoing concerns about the possible presence of harmful and potentially harmful constituents (HPHCs) in the inhaled vapor.

Additionally, clearance mechanisms of the lung, like all major points of contact with the external environment, have evolved to prevent the invasion of unwanted airborne particles from entering the body. Airway geometry, humidity and clearance mechanisms contribute to this filtration process. Inhalation delivery systems are often unable to provide the desired effect to a user because the pre-vaporized liquid becomes unstable over time or the active ingredient itself is not properly sized or dispersed for deposition in the alveolar lung. This is a problem not only for vaping, but for other inhalation delivery systems that play an increasing role in the targeted delivery of active ingredients to the human pulmonary system. This is true both for medical purposes, such as the targeted delivery of anti-cancer medications to the lungs, as well as for recreational/personal purposes, such as vaping.

In view of the foregoing, it is believed that a need exists for a vaporizer that provides an aerosol of the desired chemicals without the harmful byproducts that arise from smoldering. It is also believed that a need exists for a vaporizer that effectively and efficiently produces a vapor cloud that is not inhibited by the body's natural filtration process. It further is believed that a need exists for an active ingredient delivery system that enhances the shelf-life of the pre-vaporized liquid component and enhances the efficacy of the desired treatment/effect, while avoiding the presence of undesired HPHCs in the inhaled vapor. One or more of these needs, and still other needs, are believed to be met by one or more respective embodiments in accordance with one or more aspects and features of the invention.

SUMMARY OF THE INVENTION

The invention includes many aspects and features, and generally relates to apparatus, systems, formulations, and methods pertaining to liquids that are aerosolized and inhaled by persons using electronic devices, whether intended for personal or recreational use, or for the administration of medicines. Moreover, while many aspects and features relate to, and are described in, the context of vaping, the invention is not limited to use only in such context. Indeed, depending on the context of use, the electronic device of the invention may be considered a vaporizer and may be in the form of a vape pen or e-cigarette. Indeed, those who vape may come to refer to embodiments of the invention as a vape pen even though heat is not utilized to create the aerosol that is inhaled. In the delivery of pharmaceuticals, patients may come to refer to embodiments of the invention as a nebulizer even though a gas transport (e.g., compressed gas) is not utilized and even though the aerosol that is produced in accordance with the invention may have a smaller particle size than the mist produced by common nebulizers. Other separate and distinct contexts of use of embodiments of the invention may similarly result in different nomenclature of the embodiments of the invention. Nonetheless, while the appearance and form factor of embodiments of the invention may vary depending on such contexts of use, the basic components and operation remain the same, except where otherwise described below.

In an aspect of the invention, a cartridge assembly is configured to couple with a handheld base assembly and, preferably, are configured to magnetically couple. The handheld base assembly comprises electronics in the form of a printed circuit board and a power source in the form of a battery, which preferably is rechargeable. An electrical connection is made when the cartridge assembly is coupled with the handheld base assembly by which the cartridge assembly is powered. The base also preferably includes magnets that magnetically attract a metal plate of the cartridge assembly to secure the cartridge assembly within an opening in an end of the base. The cartridge assembly preferably is a disposable cartridge assembly.

In accordance with this aspect, the cartridge assembly comprises a cartridge and a bladder assembly contained within the cartridge. In turn, the bladder assembly comprises a bladder containing a wick and a mesh assembly that sits on top of and covers a mouth of the bladder. The wick acts to draw liquid to the mesh assembly. The wick is retained in physical engagement with the bladder proximate its bottom by protuberances that extend from the walls of the bladder. There are preferably four protuberances that surround the end of the wick in a discontinuous circular pattern and receive the end of the wick in frictional fit with each of four sides. The wick extends therefrom to and is retained in physical engagement with the mesh assembly and, in particular, a piezoelectric disk having a mesh material which, when powered by the power source, vibrates so as to aerosolize a liquid contained within the bladder and wick. The mesh assembly is held in tension on top of a lip of the mouth of the bladder by a sealing O-ring that is forced into engagement with the mesh assembly by the attachment of a mouthpiece of the cartridge assembly to the cartridge. Screws are preferably utilized in effecting the attachment whereby the force by which the O-ring is held in contact with the mesh assembly may be adjusted. A spacer on a printed circuit board of the cartridge assembly may additionally engage the bottom of the silicone bladder and hold the wick in tension therethrough. Due to these features, it is believed that the bladder and wick ensure that the mesh remains in constant contact with the liquid for consistent aerosolization each time the electronic device is triggered. The liquid preferably is supplied to the vibrating mesh at a generally constant pressure whereby a generally uniform aerosol is produced, and this is accomplished regardless of the orientation of the electronic device.

In a feature, the cartridge assembly comprises a printed circuit board or other electronics, and the cartridge assembly communicates with the handheld base assembly when coupled. Preferably, the printed circuit board includes memory that includes information regarding the liquid contained in the bladder and dosing information related thereto, e.g., the number of doses dispensed so far from the cartridge assembly. The cartridge assembly further can be programmed to only work with one or more specified handheld base assemblies to the exclusion of other handheld base assemblies. For example, a cartridge assembly could be configured to work only with a handheld base assembly of a particular person, e.g., a certain patient for whom a prescription is provided via the cartridge assembly.

In a feature, the wick has a lengthwise channel that extends between its opposite ends. The channel assists in delivery liquid to the mesh assembly for aerosolizing.

In a feature, the wick is rigid.

In a feature, opening cross sections of the mesh that is in contact with the liquid is smaller than the opening cross section that faces the mouthpiece and exit of the aerosolized liquid. The taper angle and size of the perforated mesh preferably is adjusted via electro-forming methods to achieve a laminar and non-turbulent aerosol that is best suited for deep lung penetration and will, therefore, not yield large amounts of buccal deposition.

In a feature, an airflow channel is defined between the port of the mouthpiece and a pressure sensor located within the handheld base assembly. A D-ring is provided to seal the interface between the cartridge and the mouthpiece to prevent loss of suction along the airflow channel. The airflow channel is defined by openings in the mouthpiece, the cartridge, the printed circuit board, the metal plate, and the chassis. Furthermore, while one opening is shown in connection with the mouthpiece in the drawings, three openings preferable are provided that are equally spaced around the O-ring.

In an aspect, the bladder may be filled with the liquid by injection after assembly of the cartridge assembly. Since the bladder preferably is a self-sealing silicone bladder, when the injector needle is removed, the bladder re-seals and no liquid drains or leaks out. In this aspect, the liquid may be injected as a last stop via an access port/injector port that is located on the bottom of the cartridge. Alternatively, the bladder is inserted into the cartridge and then is filled with liquid first (top-down pour) without utilizing a needle or puncturing the bladder with an injector needle. In this manner, the bladder is filled by pouring liquid into the bladder and, once the desired volume has been dispensed, the wick is inserted inside the bladder and then the bladder is capped off by the mesh assembly and the rest of the cartridge assembly is then assembled. The cartridge assembly preferably is a disposable cartridge assembly.

Additional aspects and features of a preferred commercial system and apparatus for dosing by patients are disclosed in the drawings.

Additional features of the invention are set forth in the incorporated '679 application.

Aspects of the invention also comprises using embodiments of electronic devices in accordance with aspects and features of the present invention to produce an aerosol from a liquid for inhalation by a person using such electronic device. The liquid preferably is an aqueous formulation.

In another aspect, a liquid-filled cartridge for use with an electronic device for delivery of a substance into a body through respiration comprises: a container comprising a bladder; and an aqueous formulation contained within the bladder for aerosolizing and inhaling by a person using the electronic device, the aqueous formulation including a saline component, an acid component, and a nicotine component. The acid component includes a lactic acid.

In a feature, the saline component includes a 0.9% NaCl saline solution.

In a feature, the saline component is approximately 30% by mass to approximately 99.998% by mass of the formulation.

In a feature, the acid component further includes one or more of benzoic acid, malic acid, tartaric acid, salicylic acid, levulinic acid, and hydrochloric acid.

In a feature, the acid component is approximately 0.001% by mass to approximately 25% by mass of the formulation.

In a feature, the nicotine component includes nicotine in a protonated form and nicotine in an unprotonated form.

In a feature, the nicotine component is approximately 0.001% by mass to approximately 5% by mass of the formulation.

In a feature, a pH value of the aqueous formulation measures between approximately 2 and approximately 5.

In a feature, the pH value of the aqueous formulation measures approximately 3.38.

In a feature, the aqueous formulation further includes a menthol component.

In a feature, the menthol component is approximately 0.001% by mass to approximately 15% by mass of the formulation.

In a feature, the aqueous formulation further includes an ethanol component.

In a feature, the ethanol component is approximately 0.001% by mass to approximately 10% by mass of the formulation.

In a feature, the aqueous formulation further includes a surfactant component, wherein the surfactant component includes one or more different surfactants.

In a feature, the surfactant component includes one or more of polyoxyethylene sorbitan monooleate, polyoxyethylene sorbitan monostearate, polyoxyethylene sorbitan monolaurate, lecithin, and a poloxamer.

In a feature, the surfactant component is approximately 0.001% by mass to approximately 10% by mass of the formulation.

In a feature, the aqueous formulation further includes an ethanol component and a surfactant component.

In accordance with another aspect, a method of manufacturing the cartridge comprises preparing an aqueous formulation for aerosolizing and inhaling using electronic devices includes mixing a nicotine component and an acid component to form a first mixture, separately mixing a menthol component and a saline component to form a second mixture, and mixing the first mixture and the second mixture to form a target aqueous formulation; and injecting the aqueous formulation into a bladder of the cartridge.

In accordance with another aspect, a method of manufacturing the cartridge comprises preparing an aqueous formulation for aerosolizing and inhaling using electronic devices includes mixing a nicotine component and an acid component to form a first mixture, separately mixing a menthol component and an ethanol component to form a second mixture, mixing a saline component with the second mixture to form a third mixture, and mixing the first mixture and the third mixture to form a target aqueous formulation; and injecting the aqueous formulation into a bladder of the cartridge.

In accordance with another aspect, a method of manufacturing the cartridge comprises preparing an aqueous formulation for aerosolizing and inhaling using electronic devices includes mixing a nicotine component and an acid component to form a first mixture, mixing a saline component with the first mixture to form a second mixture, separately mixing a menthol component, an ethanol component, and a surfactant component to form a third mixture, and mixing the second mixture and the third mixture to form a target aqueous formulation; and injecting the aqueous formulation into a bladder of the cartridge.

In a feature, the acid component includes a lactic acid, and the surfactant component includes polyoxyethylene sorbitan monooleate.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 4A is an exploded view of the cartridge assembly of FIG. 1C.

FIG. 4B is a perspective view of a top and a rear of a mouthpiece of the cartridge assembly of FIG. 4A.

FIG. 4C is an elevational view of the rear of the mouthpiece of FIG. 4B.

FIG. 5A is an elevational view of a front of the cartridge of the cartridge assembly of FIG. 1C.

FIG. 5B is a perspective view of the front and a top of the cartridge of FIG. 1C.

FIG. 5C is an exploded perspective view of the front, top, and a first side of the cartridge of FIG. 1C, wherein an O-ring and D-ring are removed from the remainder of the cartridge.

FIG. 6A is a perspective view of the top and front of the cartridge of FIG. 1C, wherein the O-ring and D-ring have been removed from remainder of the cartridge.

FIG. 6B is an exploded perspective view of the top, front, and the first side the cartridge of FIG. 1C, wherein two fasteners and a metal plate are removed from the remainder of the cartridge.

FIG. 6C is a perspective view of the top, side, and a rear of the cartridge of FIG. 6B, wherein the two fasteners and metal plate have been removed from the remainder of the cartridge.

FIG. 7A is an exploded perspective view of the top, rear, and first side of the cartridge of FIG. 6C, wherein a circuit board is removed from the remainder of the cartridge.

FIG. 7B is an exploded perspective view of the top, rear, and first side of the cartridge of FIG. 7A, wherein a bladder assembly of the cartridge is removed from the remainder of the cartridge.

FIG. 11 is a top plan view of the wick of FIG. 9.

FIG. 12 is a side elevational view of the wick of FIG. 9, wherein a longitudinal channel of the wick is shown.

FIG. 19A is a partial, cross-sectional view of a distal end of the front of the handheld base assembly of FIG. 16.

FIG. 19B is another partial, cross-sectional view of the distal end of the front of the handheld base assembly of FIG. 16.

Figure 1A:
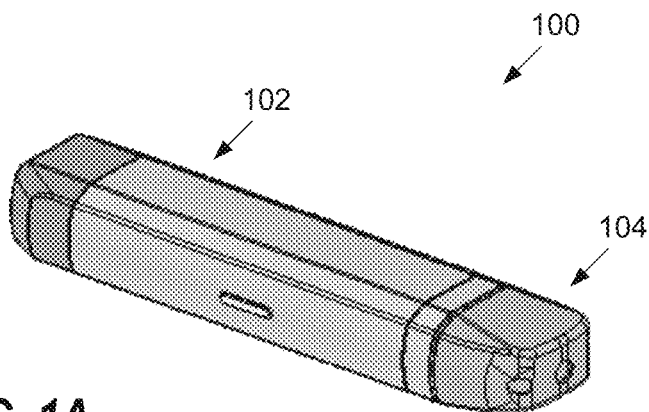
FIG. 1A illustrates an electronic device having a handheld base assembly and a cartridge assembly, in accordance with one or more preferred implementations of the invention.

Further views of a preferred embodiment of an electronic device having a handheld base assembly and a cartridge assembly, in accordance with one or more preferred implementations of the invention are contained in the incorporated computer program listing incorporated above by reference, which includes three-dimensional interactive views.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard to the construction of the scope of any claim in the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Additionally, as used herein unless context dictates otherwise, the following terms have the following meanings:

"Liquid" means a substance that flows freely but is of constant volume, generally having a consistency like that of water (lower viscosity) or oil (higher viscosity). Liquid is generic to and encompasses a solution, a suspension, and an emulsion.

"Solution" means a homogeneous mixture of two or more components. The dissolving agent is the solvent. The substance that is dissolved is the solute. The components of a solution are atoms, ions, or molecules, and the components are usually a nanometer or less in any dimension. An example of a solution is sugar mixed with water.

"Suspension" means a mixture of components that can be evenly distributed by mechanical methods such as shaking or stirring, but that will eventually settle out over an extended period of time. The components in a suspension are generally larger than those in solutions. An example of a suspension is oil mixed with water.

"Colloidal dispersion" means a heterogenous liquid mixture in which a component is dispersed in another component and does not tend to settle out over an extended period of time. The dispersed components generally is larger than components of a solution and smaller than components of a suspension.

"Aerosol" means a colloidal dispersion of a solid or liquid in a gas.

"Emulsion" means a colloidal dispersion of a liquid in a liquid. An example of an emulsion is milk.

"Nanoemulsion" means an emulsion in which the dispersed component comprises nanoparticles.

"Nanoparticle" means a molecule has—or aggregate of molecules have—having no dimension greater than about a micrometer (1,000 nanometers). In accordance with preferred embodiments of aspects and features of the invention, nanoparticles preferably have a dimension of between about 50 and about 200 nanometers.

"Micelle" means a vesicle having a layer of molecules that encapsulate and transport a substance to cells of a body. The encapsulating molecules in a micelle may be surfactants or polymers, for example. A typical micelle in an aqueous solution forms an aggregate with the hydrophilic "head" regions in contact with the surrounding solvent, creating a hydrophobic tail region in the interior of the aggregate.

"Liposome" means a vesicle having at least one bilayer of molecules that encapsulates and transports a substance to cells of a body.

Referring now to the drawings, one or more preferred embodiments in accordance with one or more aspects and features of the invention are next described. The following description of one or more preferred embodiments is merely exemplary in nature and is in no way intended to limit the invention, its implementations, or uses.

In accordance with electronic devices of the invention, a vibrating mesh is provided for aerosolizing a liquid without smoldering. The aerosolized liquid preferably is in the form of a vapor cloud similar to what a person or observer would surmise to be "vapor" when vaping. In the context of vaping, such preferred devices of the invention therefore are believed to produce an aerosol that is free of undesired carcinogens. This is in stark contrast to vaporizers used today to aerosolize e-liquids by heating the e-liquids and desired compounds contained therein (e.g., nicotine) or supplements such as B12, THC/CBD and other drugs or stimulants. As a result of using heating to aerosolize the e-liquids, these vaporizers produce toxic byproducts like formaldehyde, a recognized Group 1 carcinogen for cancer, which toxic byproducts then are unfortunately inhaled by a person using the vaporizer. For example, when the liquids are heated, the liquids undergo a thermochemical reaction producing unwanted emissions. The unwanted emissions of the toxic byproducts may cause bodily harm from extended inhalation exposure.

By utilizing a vibrating mesh, preferred electronic devices in accordance with one or more aspects and features of the invention produce an aerosol without using heat and thus advantageously avoid such toxic byproducts created by the vaporizes currently on the market. The electronic devices thereby advantageously produce a carcinogen free aerosol free of harmful emission byproducts.

The preferred electronic devices in accordance with one or more aspects and features of the invention are particularly well suited for aerosolizing a liquid for inhalation without heating and, in particular, for aerosolizing an aqueous formulation including nicotine for inhalation without heating.

Such a preferred embodiment of an electronic device is illustrated in and described with reference to FIG. 1A through FIG. 20C in accordance with one or more aspect and features of the invention. Components for a prototype cartridge assembly are seen in FIGS. 21, 22, and 23 of U.S. Patent Application Publication 2022/0132920 ("the '920 Publication"), which is incorporated herein by reference. A commercial prototype is seen in FIGS. 24A through 24G of the '920 Publication.

Yet additional views of a preferred embodiment of an electronic device having a handheld base assembly and a cartridge assembly, in accordance with one or more preferred implementations of the invention are contained in the incorporated computer program listing incorporated above by reference, which includes three-dimensional interactive views.

Other forms of an electronic device in accordance with the present invention include vapes, vape pens, and nebulizers. Other terminology may be given to electronic devices of the present invention. In any event, electronic devices of the present invention produce an aerosol for inhalation without smoldering or heating, whatever commercial or consumer name may be given.

Figure 1B:
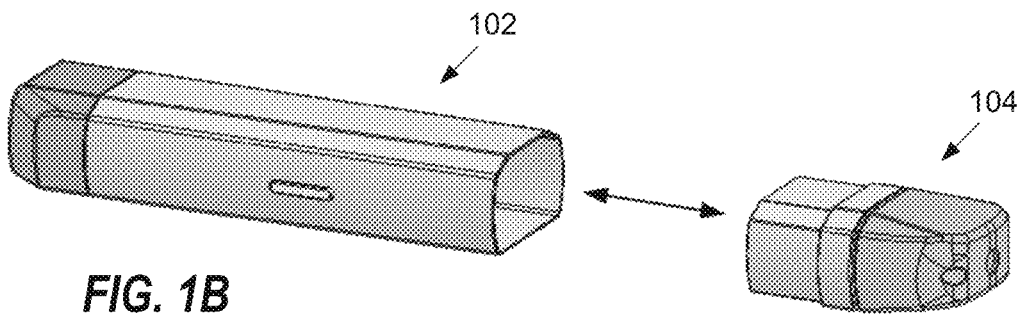
FIG. 1B illustrates the act of separating the handheld base assembly from the cartridge assembly in the electronic device of FIG. 1A.
Figure 1C:
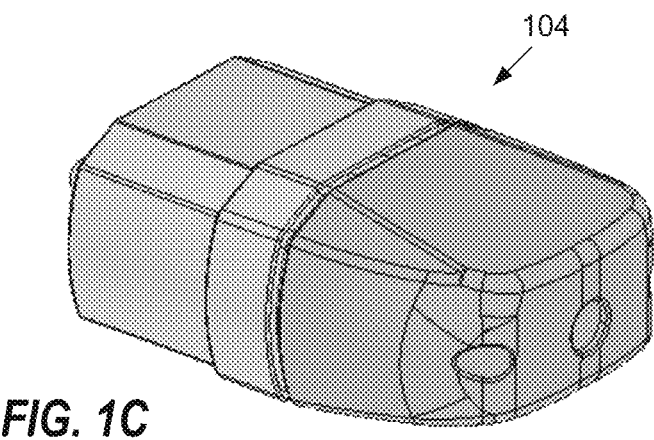
FIG. 1C illustrates a close-up view of the cartridge assembly after being separated from the handheld base assembly as illustrated in FIG. 1B.

FIG. 1A illustrates an electronic device 100 having a handheld base assembly 102 and a cartridge assembly 104, in accordance with one or more preferred implementations of the invention. The cartridge assembly and handheld base assembly are configured to removably couple together. FIG. 1B illustrates the act of separating the handheld base assembly 102 from the cartridge assembly 104 in the electronic device of FIG. 1A. Preferably, the cartridge assembly magnetically mounts onto an end of the handheld base assembly for magnetic, decoupling attachment. FIG. 1C illustrates a close-up view of the cartridge assembly 104 after being separated from the handheld base assembly as illustrated in FIG. 1B.

Figure 2A:
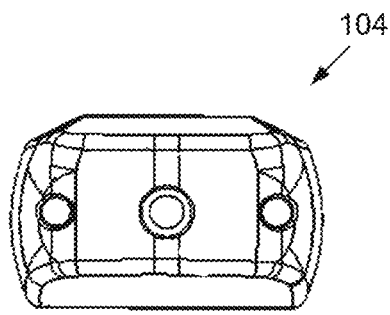
FIG. 2A illustrates a front elevational view of the cartridge assembly of FIG. 1C.
Figure 2B:
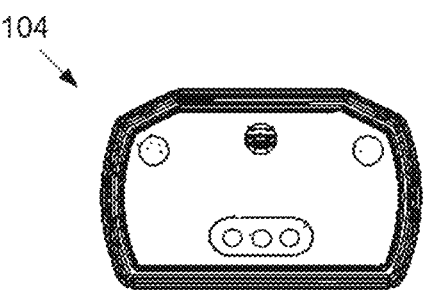
FIG. 2B illustrates a rear elevational view of the cartridge assembly of FIG. 1C.
Figure 2C:
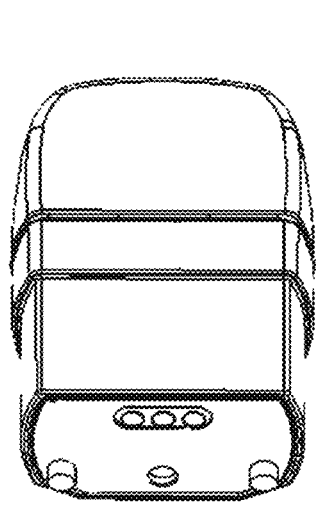
FIG. 2C illustrates a perspective view of the rear and a bottom of the cartridge assembly of FIG. 1C.
Figure 2D:
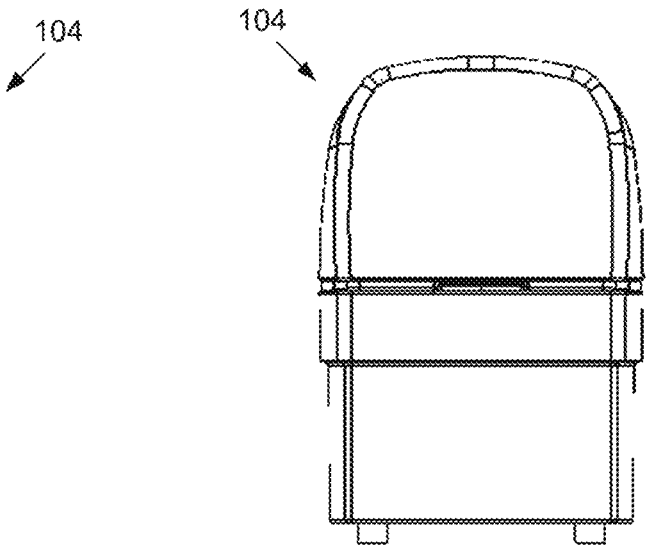
FIG. 2D illustrates a perspective view of the bottom of the cartridge assembly of FIG. 1C.
Figure 2E:
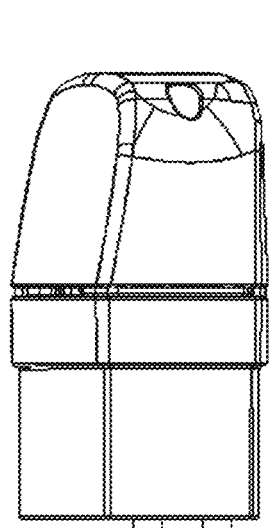
FIG. 2E illustrates a perspective view of the bottom and a first side of the cartridge assembly of FIG. 1C.
Figure 2F:
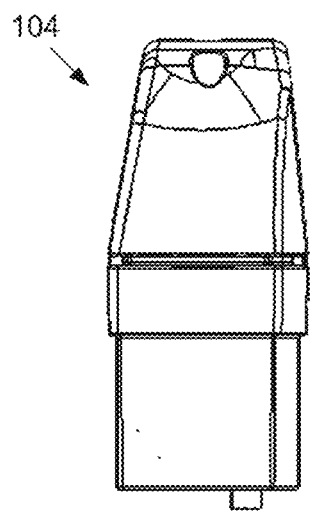
FIG. 2F illustrates a perspective view of the first side of the cartridge assembly of FIG. 1C.

With regard to FIGS. 2A-2F, FIG. 2A illustrates a front elevational view of the cartridge assembly 104 of FIG. 1C; FIG. 2B illustrates a rear elevational view of the cartridge assembly 104 of FIG. 1C; FIG. 2C illustrates a perspective view of the rear and a bottom of the cartridge assembly 104 of FIG. 1C; FIG. 2D illustrates a perspective view of the bottom of the cartridge assembly 104 of FIG. 1C; FIG. 2E illustrates a perspective view of the bottom and a first side of the cartridge assembly 104 of FIG. 1C; and FIG. 2F illustrates a perspective view of the first side of the cartridge assembly 104 of FIG. 1C.

Figure 3A:
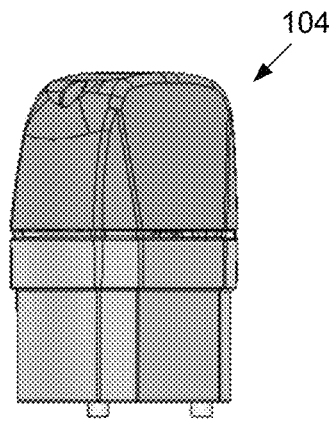
FIG. 3A illustrates a perspective view of the first side and a top of the cartridge assembly of FIG. 1C.
Figure 3B:
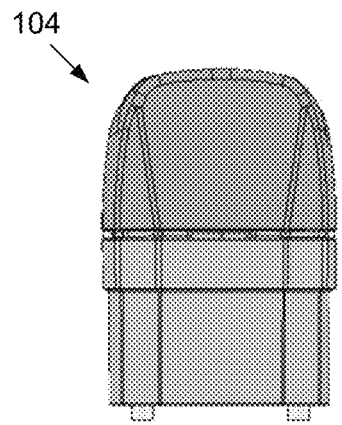
FIG. 3B illustrates a perspective view of the top of the cartridge of FIG. 1C.
Figure 3C:
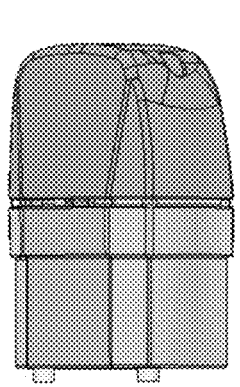
FIG. 3C illustrates a perspective view of the top and a second side of the cartridge assembly of FIG. 1C.
Figure 3D:
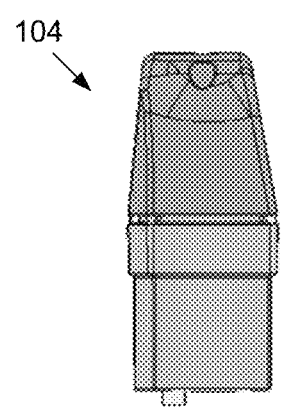
FIG. 3D illustrates a perspective view of the second side of the cartridge assembly of FIG. 1C.
Figure 3E:
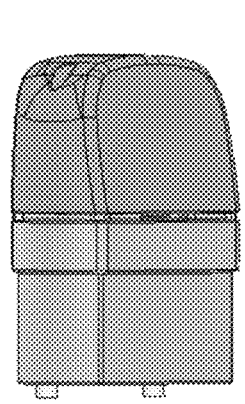
FIG. 3E illustrates a perspective view of the second side and the bottom of the cartridge assembly of FIG. 1C.
Figure 3F:
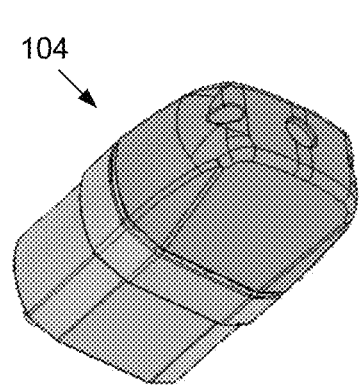
FIG. 3F illustrates a perspective view of the front, first side, and top of the cartridge assembly of FIG. 1C.

With regard to FIGS. 3A-3F, FIG. 3A illustrates a perspective view of the first side and a top of the cartridge assembly 104 of FIG. 1C; FIG. 3B illustrates a perspective view of the top of the cartridge 104 of FIG. 1C; FIG. 3C illustrates a perspective view of the top and a second side of the cartridge assembly 104 of FIG. 1C; FIG. 3D illustrates a perspective view of the second side of the cartridge assembly 104 of FIG. 1C; FIG. 3E illustrates a perspective view of the second side and the bottom of the cartridge assembly 104 of FIG. 1C; and FIG. 3F illustrates a perspective view of the front, first side, and top of the cartridge assembly 104 of FIG. 1C.

The cartridge assembly 104 comprises a mouthpiece 106; and a cartridge 108. FIG. 4A is an exploded view of the cartridge assembly 104 of FIG. 1C, wherein two fasteners 103, 105 and the mouthpiece 106 are illustrated being separated from the cartridge 108. Additionally, FIG. 4B is a perspective view of a top and a rear of a mouthpiece 106 of the cartridge assembly 104 of FIG. 4A; and FIG. 4C is an elevational view of the rear of the mouthpiece 106 of FIG. 4B.

FIG. 5A is an elevational view of a front of the cartridge 108 of the cartridge assembly of FIG. 1C. Additionally, FIG. 5B is a perspective view of the front and a top of the cartridge 108 of FIG. 1C; and FIG. 5C is an exploded perspective view of the front, top, and a first side of the cartridge 108 of FIG. 1C, wherein an O-ring 110 and D-ring 112 are removed from the cartridge 108. An airflow channel is defined between the port of the mouthpiece and a pressure sensor located within the handheld base assembly, and the D-ring preferably is provided to seal the interface between the cartridge and the mouthpiece to prevent loss of suction along the airflow channel. The airflow channel is defined by openings in the mouthpiece, the cartridge, the printed circuit board, the metal plate, and the chassis. Furthermore, while one opening is shown in connection with the mouthpiece in the drawings, three openings preferable are provided that are equally spaced around the O-ring.

FIG. 6A is a perspective view of the top and front of the cartridge 108 of FIG. 1C, wherein the O-ring 112 and D-ring 110 have been removed from remainder of the cartridge 108. Additionally, FIG. 6B is an exploded perspective view of the top, front, and the first side the cartridge 108 of FIG. 1C, wherein two fasteners 111, 113 and a metal plate 114 are being separated from the remainder of the cartridge 108. The metal plate 114 is used to couple the cartridge assembly 104 to one or more magnets located in a distal end 140 of the base assembly 102. FIG. 6C is a perspective view of the top, side, and a rear of the cartridge 108 of FIG. 6B, wherein the two fasteners 111, 113 and metal plate 114 have been removed from the remainder of the cartridge 108.

FIG. 7A is an exploded perspective view of the top, rear, and first side of the cartridge 108 of FIG. 6C, wherein a circuit board 116 is removed from the remainder of the cartridge 108. The cartridge assembly 104 comprises a bladder assembly 118; and FIG. 7B is an exploded perspective view of the top, rear, and first side of the cartridge 108 of FIG. 7A, wherein a bladder assembly 118 is removed from the cartridge 108.

Figure 8A:
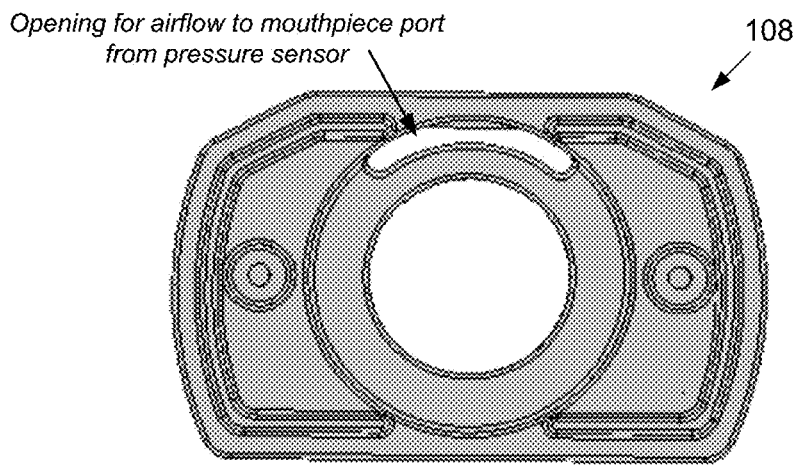
FIG. 8A is a perspective view of a front of the remainder of the cartridge of FIG. 7B after the bladder assembly has been removed.
Figure 8B:
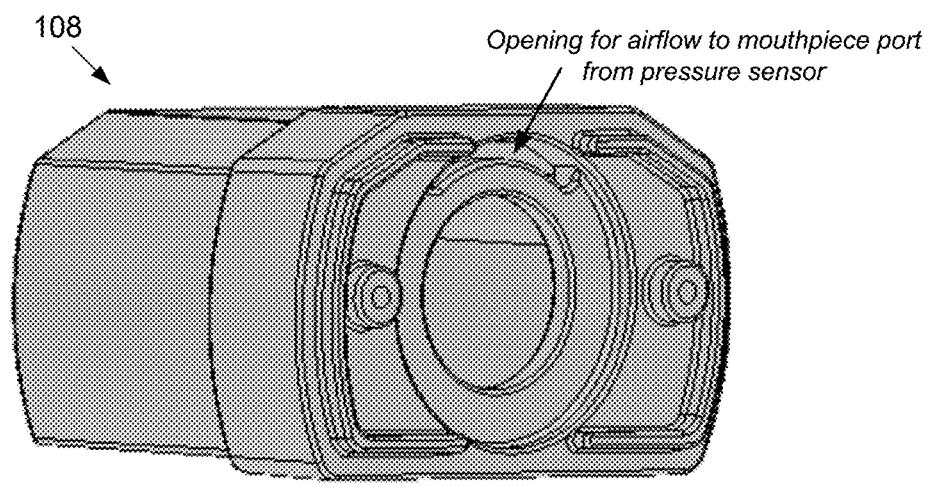
FIG. 8B is a perspective view of the front and a first side of the remainder of the cartridge of FIG. 8A.
Figure 8C:
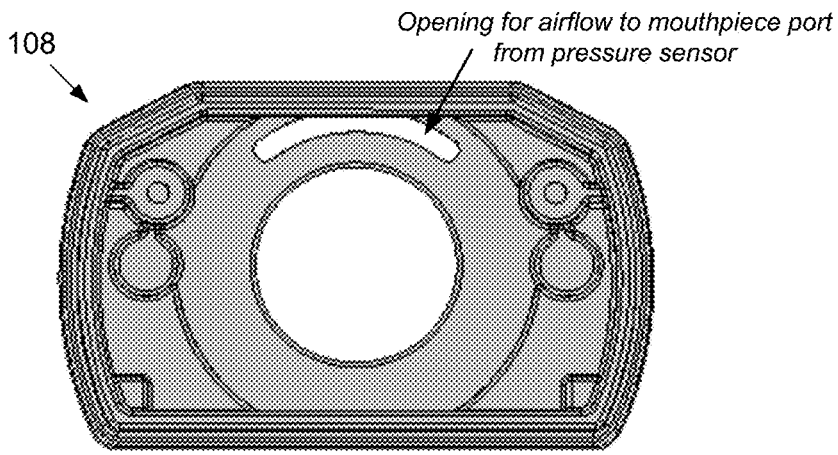
FIG. 8C is a perspective view of a rear of the remainder of the cartridge of FIG. 8A.

FIG. 8A is a perspective view of a front of the remainder of the cartridge 108 of FIG. 7B after the bladder assembly 118 has been removed. Additionally, FIG. 8B is a perspective view of the front and a first side of the remainder of the cartridge 108 of FIG. 8A; and FIG. 8C is a perspective view of a rear of the remainder of the cartridge 108 of FIG. 8A.

Figure 9:
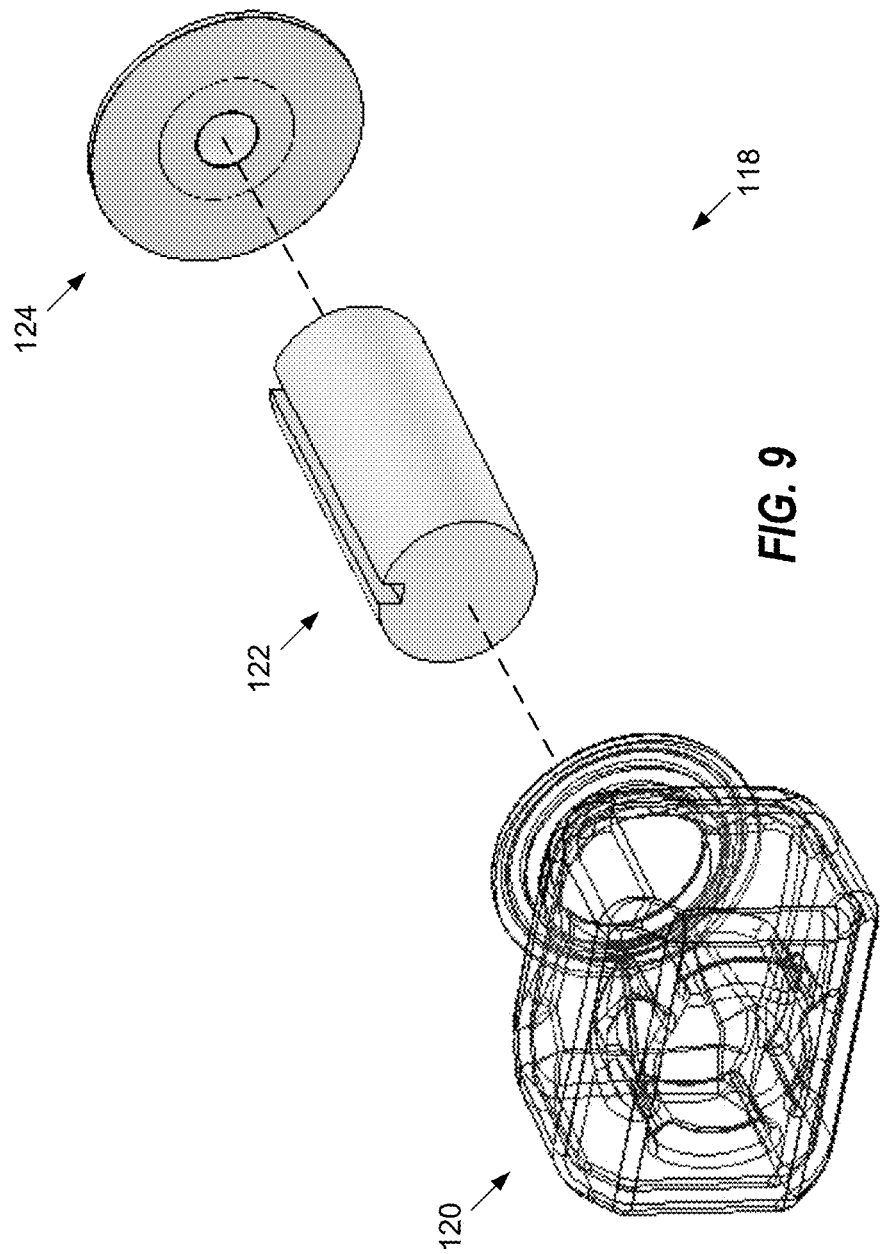
FIG. 9 is an exploded perspective view of the bladder assembly of FIG. 7B, wherein the cartridge bladder assembly including a bladder, a wick, and a mesh assembly.

The bladder assembly 118 comprises a bladder 120; a wick 122 contained within the bladder 120; and a mesh assembly 124. FIG. 9 is an exploded perspective view of the bladder assembly 118 of FIG. 7B. The mesh assembly 124 preferably is disposed on top of a lip of a mouth of the bladder 120, the bladder 120 extending through an opening in the cartridge 108 to define the mouth.

Figure 10A:
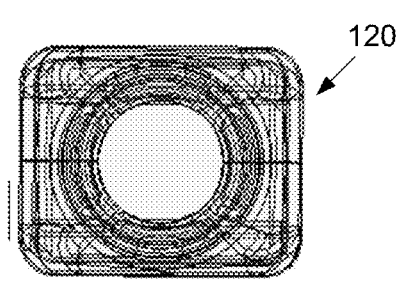
FIG. 10A is a perspective view of a top of the bladder of FIG. 9.
Figure 10B:
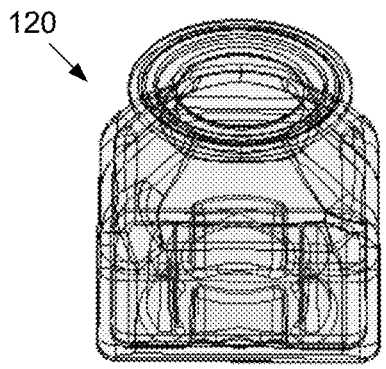
FIG. 10B is a perspective view of the top and a front of the bladder of FIG. 9.
Figure 10C:
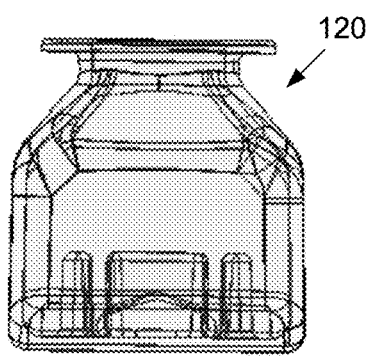
FIG. 10C is a perspective view of the front of the bladder of FIG. 9.
Figure 10D:
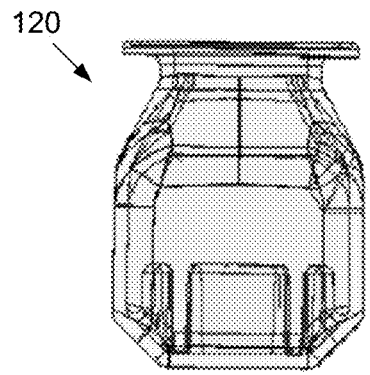
FIG. 10D is a perspective view of a first side the bladder of FIG. 9.
Figure 10E:
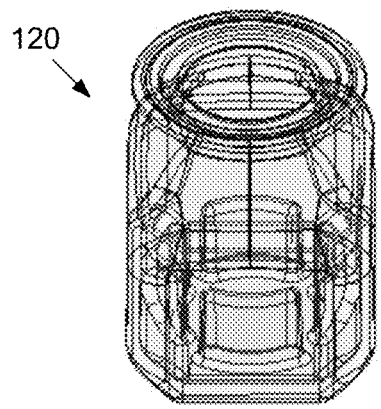
FIG. 10E is a perspective view of the top and the first side the bladder of FIG. 9.

FIG. 10A is a perspective view of a top of the bladder 120 of FIG. 9. Additionally, FIG. 10B is a perspective view of the top and a front of the bladder 120 of FIG. 9; FIG. 10C is a perspective view of the front of the bladder 120 of FIG. 9; FIG. 10D is a perspective view of a first side the bladder 120 of FIG. 9; and FIG. 10E is a perspective view of the top and the first side the bladder 120 of FIG. 9.

For purposes of further illustration, FIG. 11A of the '920 Publication is the view of FIG. 10A illustrated only with shading; FIG. 11B of the '920 Publication is the view of FIG. 10B illustrated only with shading; FIG. 11C of the '920 Publication is the view of FIG. 10C illustrated only with shading; FIG. 11D of the '920 Publication is the view of FIG. 10D illustrated only with shading; and FIG. 11E of the '920 Publication is the view of FIG. 10E illustrated only with shading.

FIG. 12A of the '920 Publication is a perspective view illustrated only with shading of the bladder 120 of FIG. 9.

FIG. 12B of the '920 Publication is a perspective view illustrated only with shading of the bladder 120 and the wick 122 of FIG. 9.

Figure 13D:
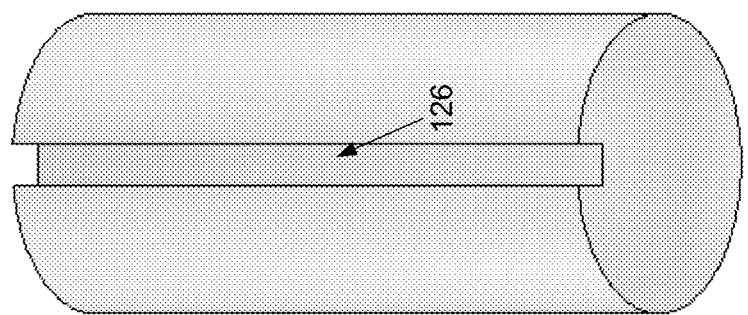
FIG. 13A is a perspective view of the top and the side of the wick of FIG. 9, wherein the longitudinal channel of the wick is shown.
FIG. 13B is a perspective view of a bottom and the side of the wick of FIG. 9, wherein the longitudinal channel of the wick is shown.
Figure 13C:
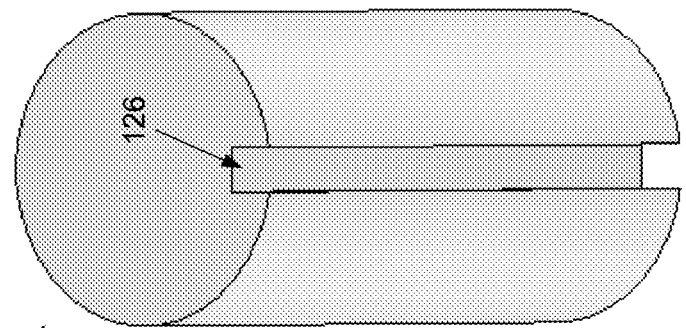
Figure 13A:
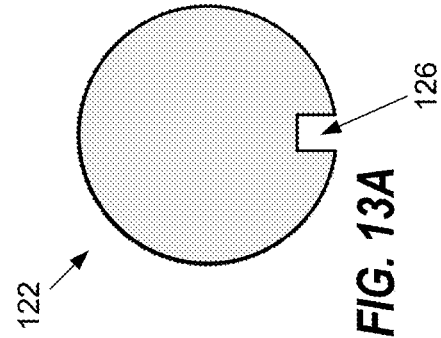
Figure 13B:
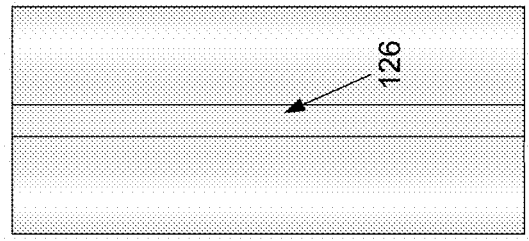

The wick 122 of the bladder assembly 118 preferably comprises a lengthwise channel 126. FIG. 11 is a top plan view of the wick 122 of FIG. 9; FIG. 12 is a side elevational view of the wick 122 of FIG. 9, wherein a longitudinal channel 126 of the wick 122 is shown; FIG. 13A is a perspective view of the top and the side of the wick 122 of FIG. 9, wherein the longitudinal channel 126 of the wick 122 also is shown; and FIG. 13B is a perspective view of a bottom and the side of the wick 122 of FIG. 9, wherein the longitudinal channel 126 of the wick 122 again is shown. The channel 126 preferably extends between distal ends of the wick 122 and preferably is an open ended channel at both ends, as shown in these figures. The wick may be rigid and the lengthwise channel that extends between its opposite ends assists in delivery liquid to the mesh assembly for aerosolizing.

Figure 14A:
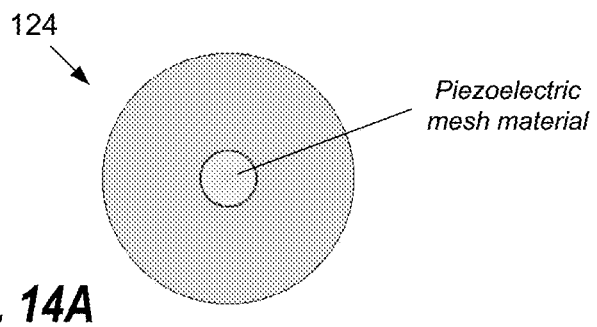
FIG. 14A is a top plan view of the mesh assembly of FIG. 9, wherein electrical connections are omitted for clarity.
Figure 14B:
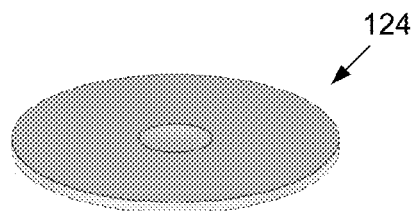
FIG. 14B is a perspective view of the top and a side of the mesh assembly of FIG. 14A.
Figure 14C:
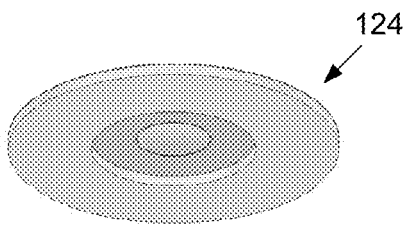
FIG. 14C is a perspective view of the side and a bottom of the mesh assembly of FIG. 14A.
Figure 14D:
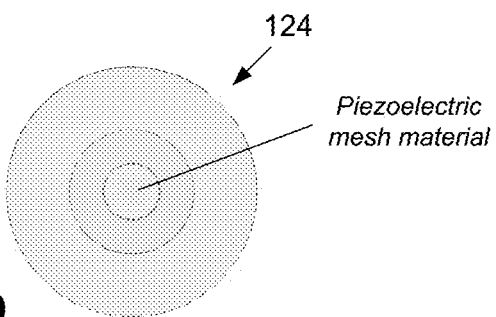
FIG. 14D is a bottom plan view of the mesh assembly of FIG. 14A.

FIG. 14A is a top plan view of the mesh assembly 124 of FIG. 9, wherein electrical connections are omitted for clarity. FIG. 14B is a perspective view of the top and a side of the mesh assembly 124 of FIG. 14A; FIG. 14C is a perspective view of the side and a bottom of the mesh assembly 124 of FIG. 14A; and FIG. 14D is a bottom plan view of the mesh assembly 124 of FIG. 14A.

The mesh assembly 124 comprises a mesh material and a piezoelectric material; preferably, the mesh assembly 124 comprises a piezo mesh disk. Opening cross sections of the mesh that is in contact with the liquid preferably are smaller than the opening cross sections that face the mouthpiece and exit of the aerosolized liquid. The taper angle and size of the perforated mesh preferably is adjusted during manufacture via electro-forming methods so as to achieve a laminar and non-turbulent aerosol that is best suited for deep lung penetration and will, therefore, not yield large amounts of buccal deposition. The mesh material is configured to vibrate when the piezoelectric material is actuated, whereby an aerosol is produced when the mesh material contacts a liquid of the bladder 120 such that the aerosol may be inhaled through the mouthpiece 106. The wick 122 acts to draw liquid from the bladder 120 to the mesh assembly 124. The wick 122 preferably is retained in constant physical contact with the mesh assembly 124. In particular, an end of the wick 122 preferably is secured by the protuberances of the bladder extending from the walls proximate a bottom of the bladder, and the wick has a length such that a distal end of the wick 122 is maintained in contact with the mesh assembly when the bladder assembly 118 is assembled, the opposite end of the wick 122 being held in place by the protuberances of the bladder 120.

In greater detail, the wick 122 is retained in physical engagement with the bladder 120 proximate its bottom by protuberances that extend from the walls of the bladder. There are preferably four protuberances that surround the end of the wick 122 in a discontinuous circular pattern and receive the end of the wick 122 in frictional fit with each of four sides. The wick 122 extends therefrom to and is retained in physical engagement with the mesh assembly 124 and, in particular, a piezoelectric disk having a mesh material which, when powered by the power source, vibrates so as to aerosolize a liquid contained within the bladder 120 and conveyed in the wick 122. The mesh assembly 124 is held in tension on top of a lip of the mouth of the bladder 120 by a sealing O-ring (see, e.g., FIG. 21 of the '920 Publication, O-ring 212) that is forced into engagement with the mesh assembly 124 by the attachment of the mouthpiece 108.

Screws are preferably utilized in effecting the attachment whereby the force by which the O-ring is held in contact with the mesh assembly may be adjusted. A spacer on a printed circuit board of the cartridge assembly may additionally engage the bottom of the silicone bladder and hold the wick in tension therethrough. Due to these features, it is believed that the bladder and wick ensure that the mesh remains in constant contact with the liquid for consistent aerosolization each time the electronic device is triggered. The liquid preferably is supplied to the vibrating mesh at a generally constant pressure whereby a generally uniform aerosol is produced, and this is accomplished regardless of the orientation of the electronic device.

During a preferred manufacture of the disposable cartridge assembly, the bladder is filled with a liquid by injection after assembly of the disposable cartridge assembly. Since the bladder preferably is a self-sealing silicone bladder, when the injector needle is removed, the bladder re-seals and no liquid drains or leaks out. In this aspect, the liquid may be injected as a last stop via an access port/injector port that is located on the bottom of the cartridge. Alternatively, the bladder is inserted into the cartridge and then is filled with liquid first (top-down pour) without utilizing a needle or puncturing the bladder with an injector needle. In this manner, the bladder is filled by pouring liquid into the bladder and, once the desired volume has been dispensed, the wick is inserted inside the bladder and then the bladder is capped off by the mesh assembly and the rest of the disposable cartridge assembly is then assembled.

The handheld base assembly 102 comprises circuitry; and a power supply for actuating the mesh assembly 124 when the base assembly 102 and cartridge assembly 104 are coupled together, preferably through the pins that engage electrical contacts when the base assembly 102 and cartridge assembly 104 are coupled. One or more of the pins further are provided for electronic communication between circuitry of the handheld base assembly 102 and non-transitory machine-readable memory located within the cartridge assembly 104.

Figure 15:
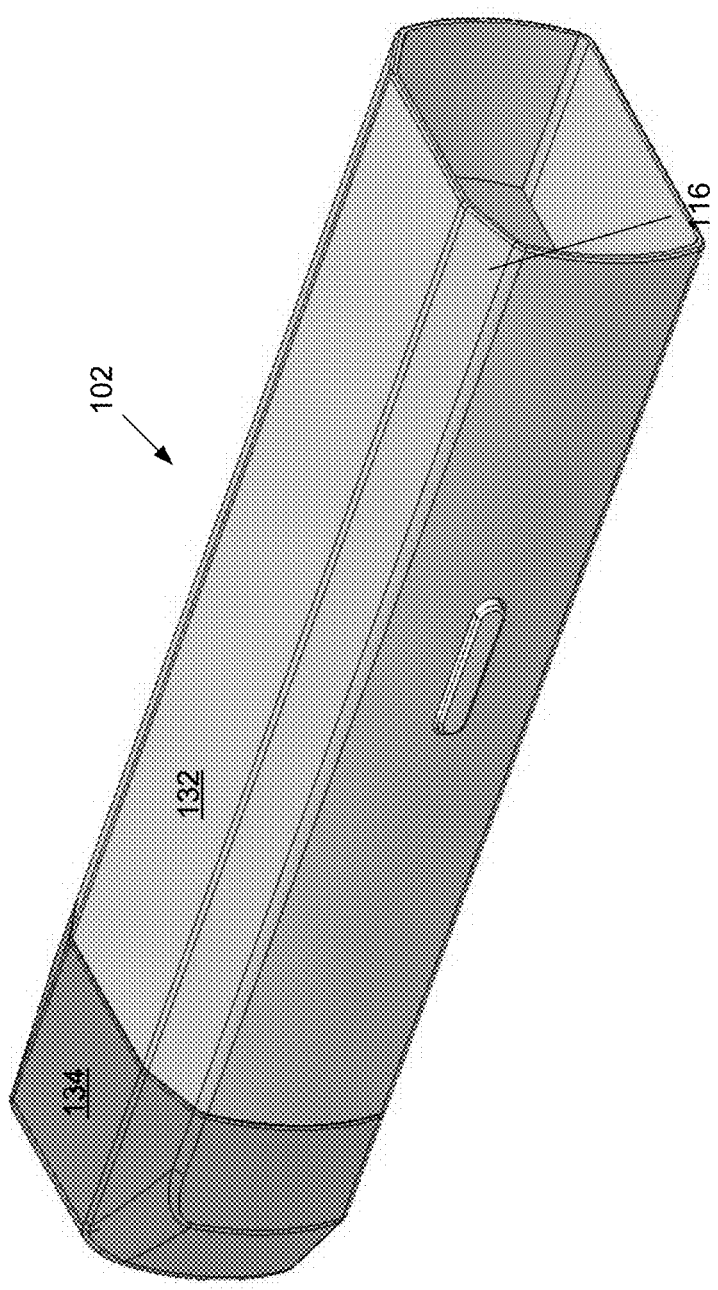
FIG. 15 is a perspective view of the handheld base assembly of FIG. 1B.

FIG. 15 is a perspective view of the handheld base assembly 102 of FIG. 1B.

Figure 16:
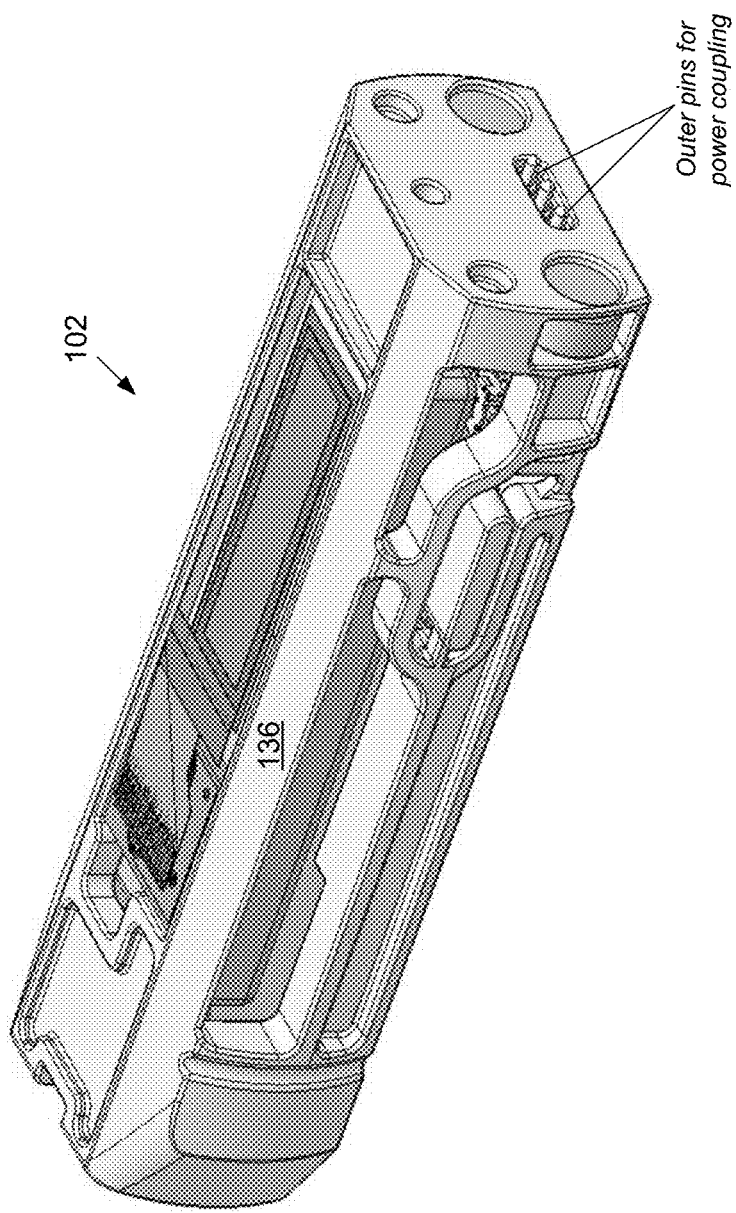
FIG. 16 is the perspective view of the handheld base assembly of FIG. 15, wherein the skin and tail are omitted.
Figure 17:
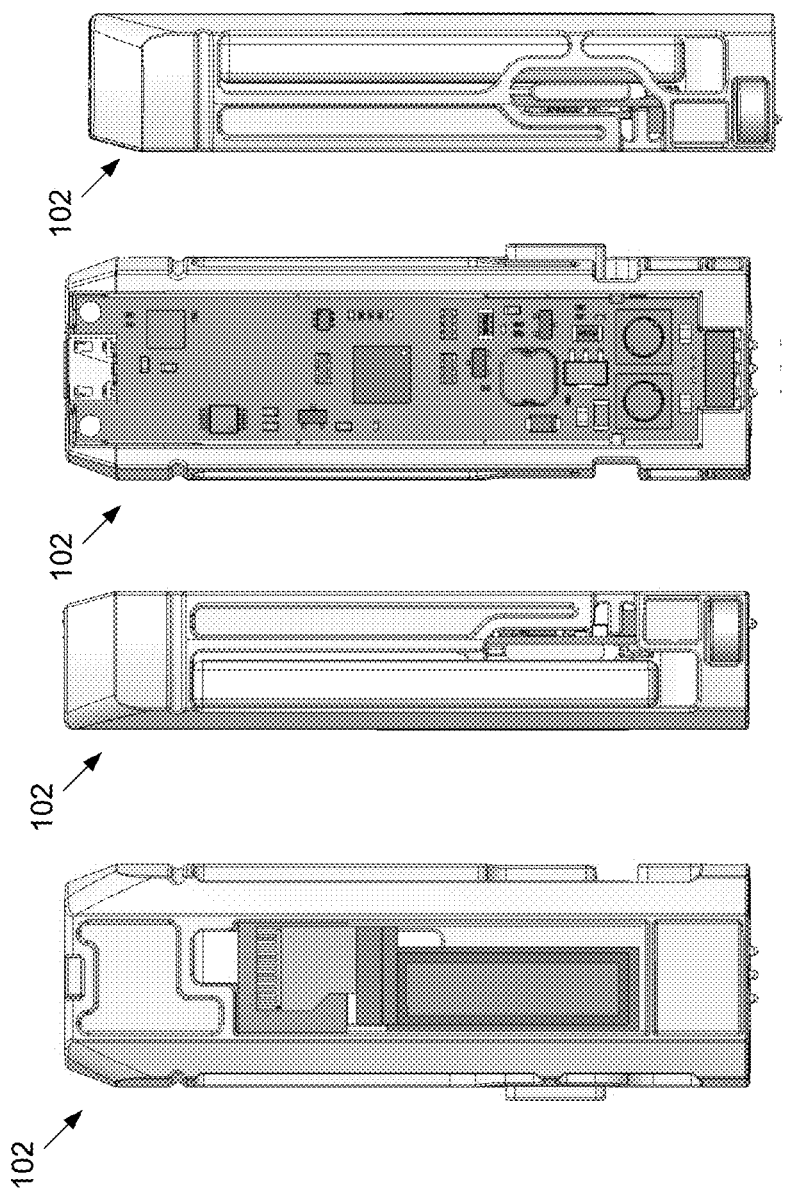
FIG. 17A is a front elevational view of the handheld base assembly of FIG. 16.
FIG. 17B is a rear elevational view of the handheld base assembly of FIG. 16.
FIG. 17C is a top plan view of the handheld base assembly of FIG. 16.
FIG. 17D is an elevational view of a first side of the handheld base assembly of FIG. 16.
FIG. 17E is a bottom plan view of the handheld base assembly of FIG. 16.
FIG. 17F is an elevational view of a second, opposite side of the handheld base assembly of FIG. 16.

FIG. 16 is the perspective view of the handheld base assembly 102 of FIG. 15, wherein the skin 132 and tail 134 are omitted.

FIG. 17A is a front elevational view of the handheld base assembly 102 of FIG. 16; FIG. 17B is a rear elevational view of the handheld base assembly 102 of FIG. 16; FIG. 17C is a top plan view of the handheld base assembly 102 of FIG. 16; FIG. 17D is an elevational view of a first side of the handheld base assembly 102 of FIG. 16; FIG. 17E is a bottom plan view of the handheld base assembly 102 of FIG. 16; and FIG. 17F is an elevational view of a second, opposite side of the handheld base assembly 102 of FIG. 16.

Figure 18:
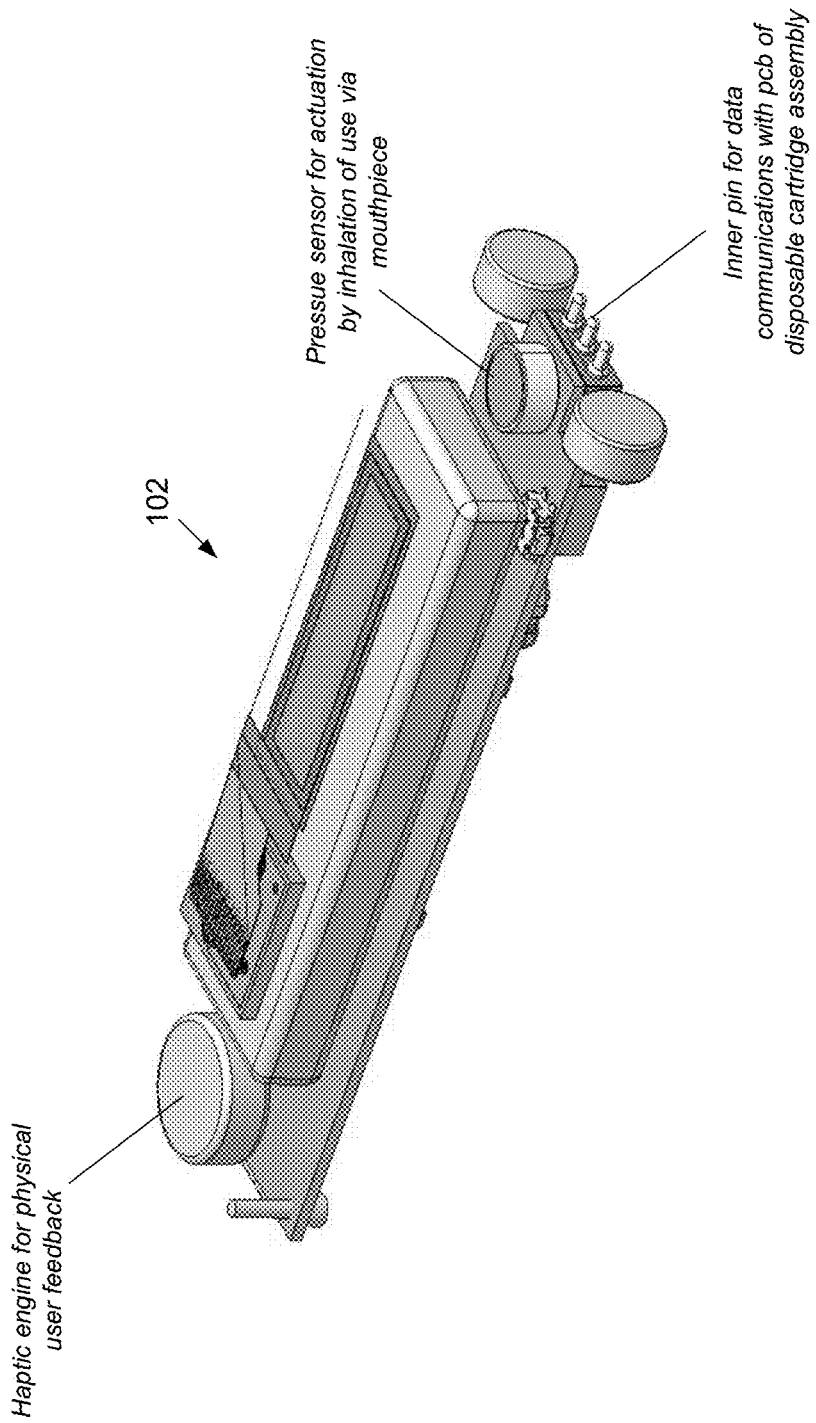
FIG. 18 is the perspective view of FIG. 16, wherein the chassis is further omitted.

FIG. 18 is the perspective view of the handheld base assembly 102 of FIG. 16, wherein the chassis 136 is further omitted.

Figure 19C:
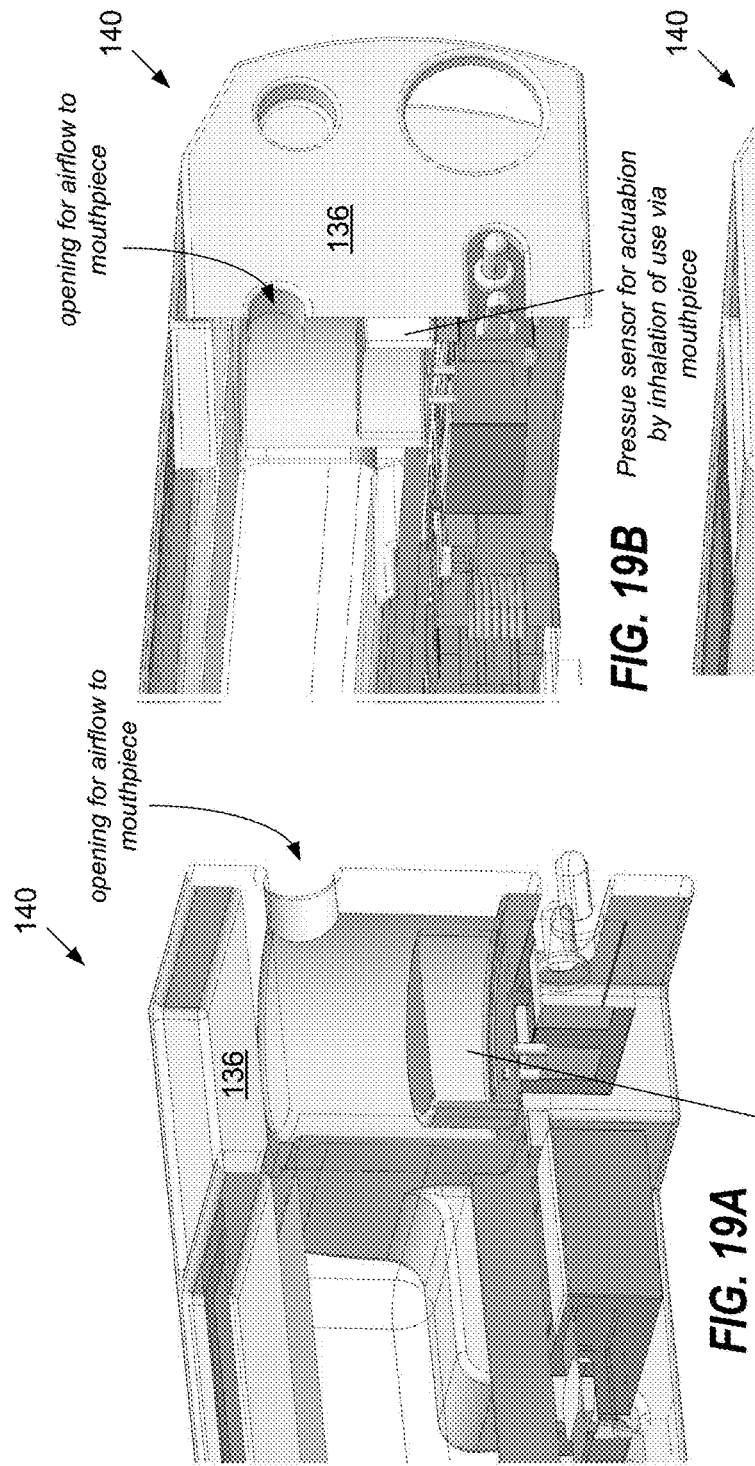
FIG. 19C is a partial view of the distal end of the front of the handheld base assembly of FIG. 16 similar to that of FIG. 19B, but not in cross-section.

FIG. 19A is a partial, cross-sectional view of a distal end 140 of the front of the handheld base assembly of FIG. 16; FIG. 19B is another partial, cross-sectional view of the distal end 140 of the front of the handheld base assembly of FIG. 16; and FIG. 19C is a partial view of the distal end 140 of the front of the handheld base assembly of FIG. 16 similar to that of FIG. 19B, but not in cross-section.

Figure 20A:
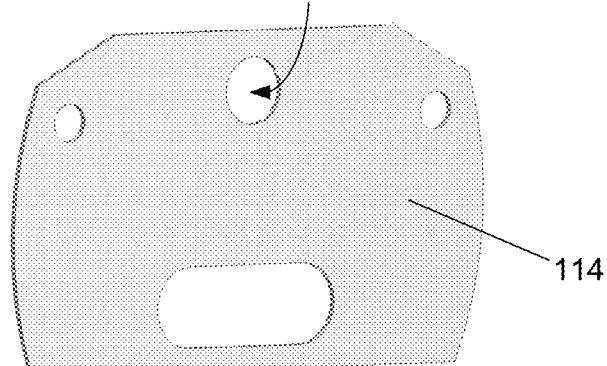
FIG. 20A is a perspective view of the metal plate of FIG. 6B.
Figure 20B:
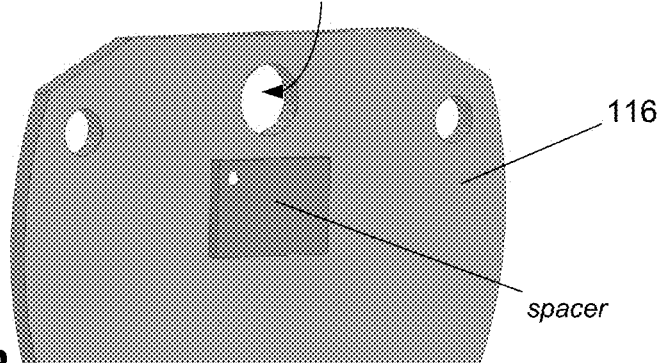
FIG. 20B is a perspective view of the printed circuit board of FIG. 7A.
Figure 20C:
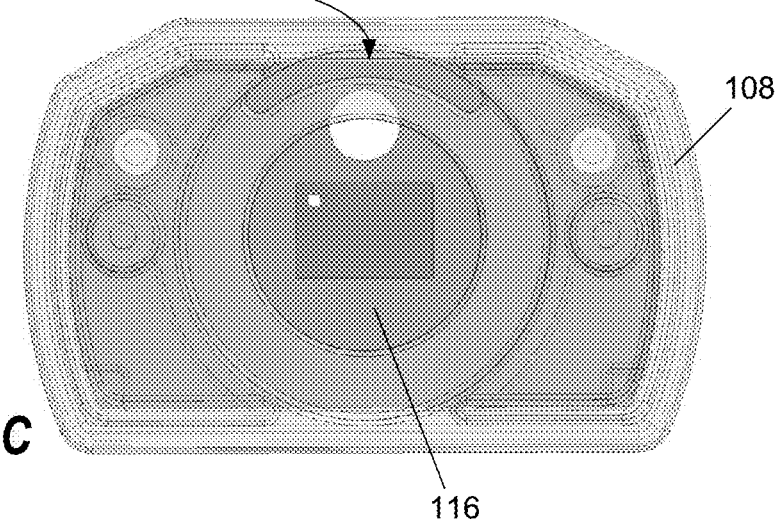
FIG. 20C is a front elevational view of the cartridge and printed circuit board, wherein the cartridge is transparently shown.
Figure 21:
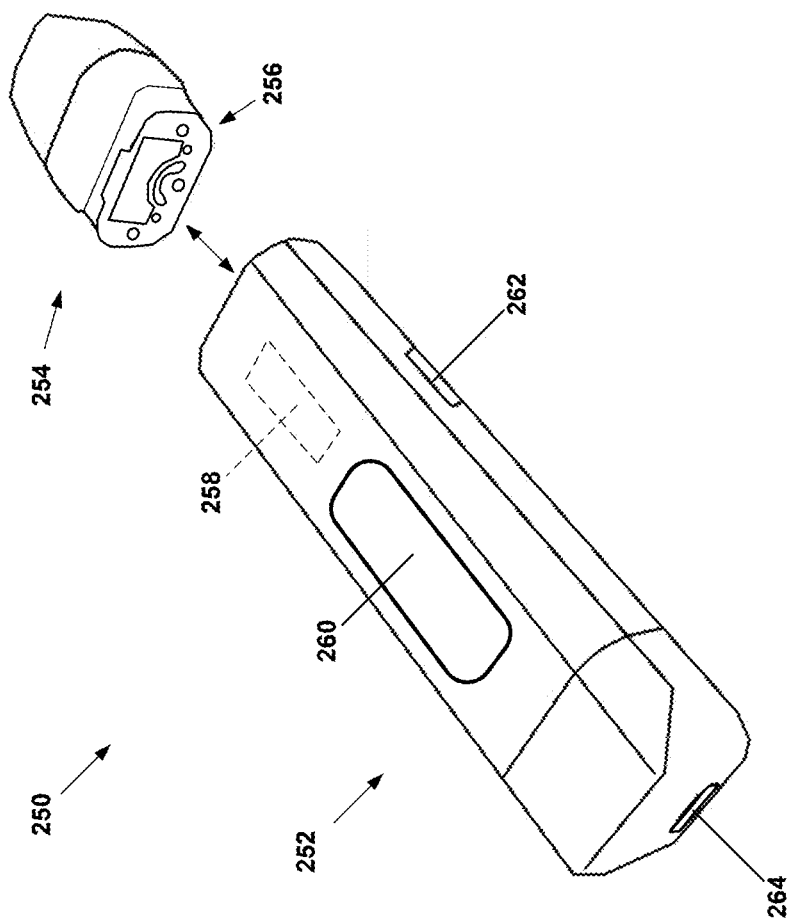
FIG. 21 is a perspective view of another prototype commercial embodiment of a preferred commercial system and apparatus for dosing by patients.

FIG. 20A is a perspective view of the metal plate 114 of FIG. 6B; FIG. 20B is a perspective view of the printed circuit board 116 of FIG. 7A; and FIG. 20C is a front elevational view of the cartridge 108 and printed circuit board 116, wherein the cartridge 108 is transparently shown.

FIG. 21 of the '920 Publication is a view of disassembled components of a cartridge assembly 204 of a prototype commercial embodiment 200 of the invention. As disclosed above, the mesh assembly 124 is held in tension on top of a lip of a mouth of the bladder by a sealing O-ring 212 that is forced into engagement with the mesh assembly by the attachment of the mouthpiece 208 to the cartridge 218. A D-ring 210 is provided to seal the interface between the mouthpiece 208 and the cartridge 218.

FIG. 22 of the '920 Publication is a perspective view of the bladder 220 of the cartridge assembly 204 of FIG. 21 of the '920 Publication.

FIG. 23 of the '920 Publication is a perspective view of the bladder 220 of FIG. 22 positioned within the cartridge 204 of FIG. 21 of the '920 Publication.

With regard to a prototype commercial embodiment, FIG. 24A of the '920 Publication is an elevational view of a top of the prototype commercial embodiment 200. Additionally, FIG. 24B of the '920 Publication is an elevational view of a top of a prototype commercial embodiment 200, wherein "WAVE" is being displayed on a display; and FIG. 24C of the '920 Publication is an elevational view of the top of the prototype commercial embodiment 200, wherein a dose count of 97 is being displayed on the display. FIG. 24D of the '920 Publication is a perspective partial view of the prototype commercial embodiment 200 while a vapor is emitted from the mouthpiece. FIG. 24E of the '920 Publication is a perspective view of the prototype commercial embodiment 200 as an upward force is applied to the cartridge assembly 204 using two fingers while the base assembly 202 is held by the remaining fingers of a hand. FIG. 24F of the '920 Publication is a perspective view of the prototype commercial embodiment 200 following the application of the upward force of FIG. 24E of the '920 Publication , wherein the cartridge assembly 204 has been decoupled and removed from the handheld base assembly 202. FIG. 24G of the '920 Publication is a view of the prototype commercial embodiment 200, wherein the decoupled cartridge assembly 204 has been inverted to show a bottom thereof.

FIG. 21 is a perspective view of another prototype commercial embodiment intended for use in a preferred commercial system and apparatus for dosing by patients. Preferably, in such system and apparatus, the disposable cartridge assembly 254 of the electronic device 250 comprises a printed circuit board or other electronic circuitry 256, and the disposable cartridge assembly communicates with electronic circuitry 258 contained in the handheld base assembly 252 when coupled therewith. Circuitry 258 preferably supports the capabilities of the disposable cartridge assembly as well as manages the OLED display 260, recharging of the power source through USB port 264, and operation of the button 262.

Preferably, the printed circuit board or other electronic circuitry 256 includes non-transitory machine-readable memory, such as flash memory, that includes information regarding the liquid contained in the bladder and dosing information related thereto, e.g., the number of doses dispensed so far from the disposable cartridge assembly. The disposable cartridge assembly further may be configured or programmed to only work with one or more specified handheld base assemblies to the exclusion of other handheld base assemblies. In this respect, each handheld base assembly may include a unique identifier or other information, such as an encryption key, in non-transitory machine-readable memory, such as read-only memory, as part of the electronic circuitry 258. Thus, for example, a disposable cartridge assembly could be configured to work only with a handheld base assembly of a particular person, e.g., a certain patient for whom a prescription is provided via the disposable cartridge assembly, to whom the handheld base assembly has been specifically programmed or configured. A plurality of disposable cartridge assemblies then may be provided to the patient over time as part of a subscription/ prescription, in-home delivery system for continuity of care, especially in chronic disease management, wherein each disposable cartridge assembly is configured to work only with the handheld base assembly specifically programmed or configured for that specific patient and no other.

The electronic device 250 preferably comprises a breath-actuated, accurate, and efficient metered-dose delivery system. A haptic engine is provided for customizable haptic vibration to signal the end of precisely metered dose. The haptic feedback thus provides a biofeedback loop that preferably is customizable through a mobile app via wireless communication or communication, such as Bluetooth, or via the USB-port used for recharging the power source. The communications also provide a means for compliance check as well as provides accessible, real-time electronic medical record (EMR) data for providers, clinicians, and patients. Such communications further enable cartridge tracking, monitoring, user authentication, and geo-fencing capabilities for an increase standard of care and patience outcomes.

In the system using the electronic device 250 disclosed in FIG. 21, the patient's inhalation through a pressure sensor triggers the vibrating mesh to activate under normal use. Bluetooth-enabled mobile app integration logs precise dosing data in real-time, which is easily accessed by the patient and clinician. An OLED display visually indicates data to the patient including, for example, dose count, and displays intelligent prompts to the patient. The disposable cartridge assembly monitoring and memory capabilities further provide lifecycle, tamper-proof and chain of custody compliance from manufacture to delivery.

With regard to additional aspects, features and embodiments of the invention, the bladder preferably is filled with a liquid comprising an aqueous formulation comprising a saline component; an acid component, wherein the acid component includes a lactic acid; and a nicotine component.

Figure 22A:
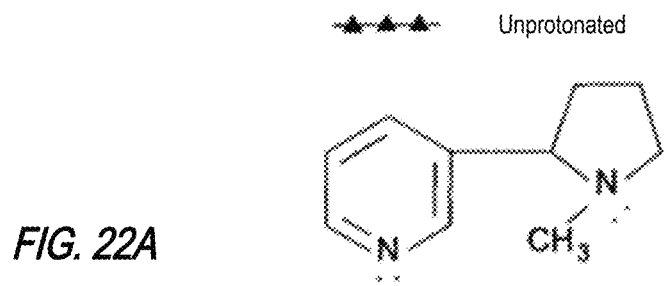
FIGS. 22A-22C are structural formulae for unprotonated nicotine, monoprotonated nicotine, and diprotonated nicotine, respectively.
Figure 22B:
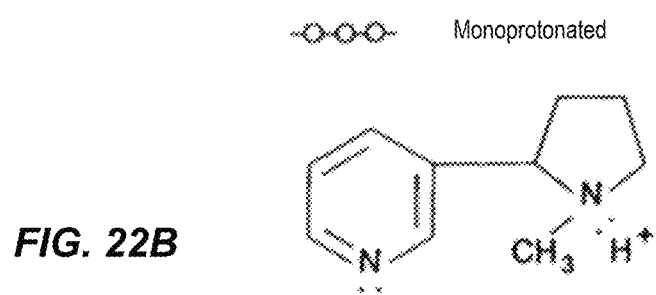
Figure 22C:
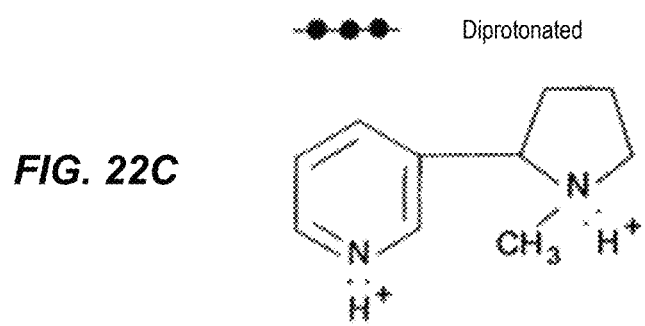
Figure 22D:
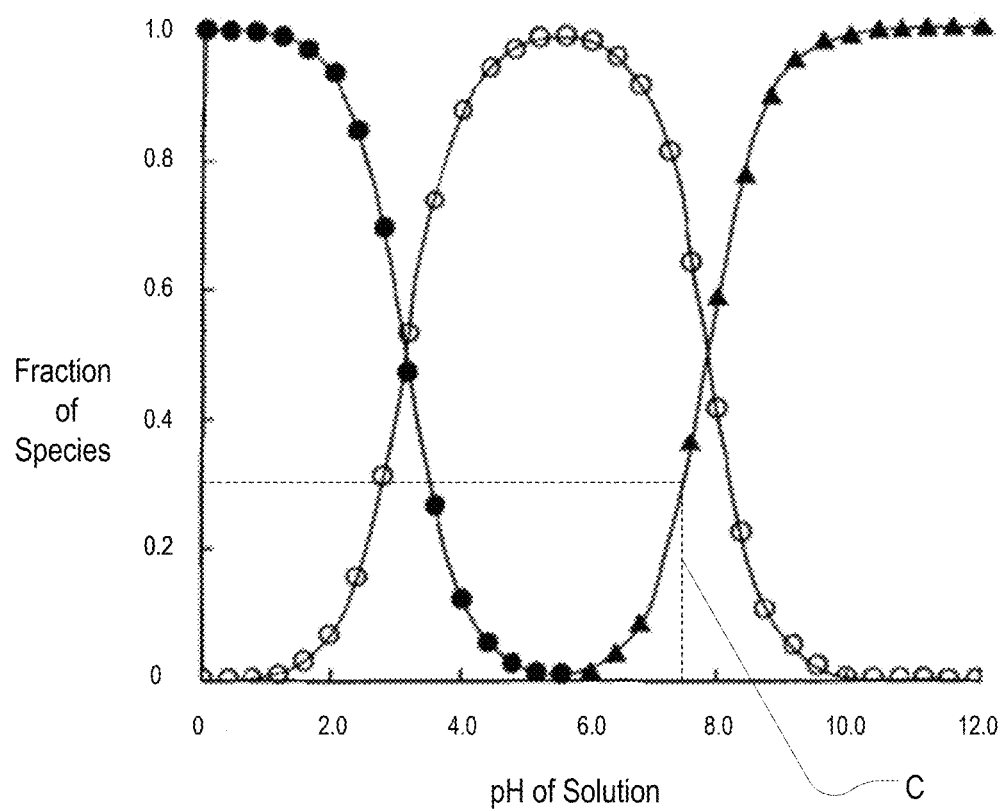
FIG. 22D is a graphical representation illustrating the relationship between pH and the relative fraction of each species of FIGS. 22A-22C in solution.
Figure 23:
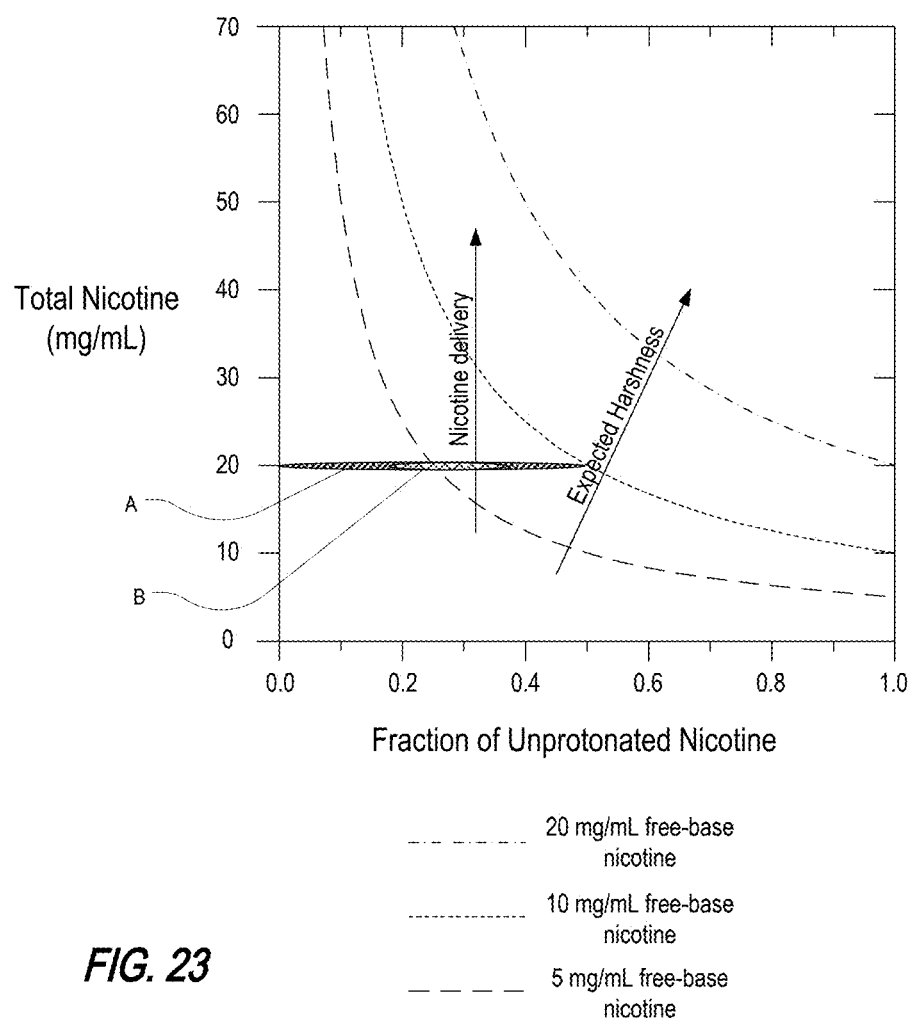
FIG. 23 is a graphical representation illustrating the relationship between total nicotine concentration and an unprotonated fraction of total nicotine and how that relationship can inform a sensory experience.

With reference to FIG. 22A through FIG. 27, preferred aqueous formulations for aerosolizing and inhaling are disclosed. In this regard, FIG. 22A through FIG. 22G are structural formulae for unprotonated nicotine, monoprotonated nicotine, and diprotonated nicotine, respectively. In its unprotonated (or "free-base") form, which is depicted in FIG. 22A, nicotine is a weak base having a $pK_a$ value of 8.0. As shown in FIG. 22A, the unprotonated form of nicotine includes two nitrogen atoms that exhibit basic properties. By adding one proton to one of the two nitrogen atoms, the unprotonated form becomes a monoprotonated form, which is depicted in FIG. 22B. Adding another proton to the other of the two nitrogen atoms transitions the monoprotonated form to a diprotonated form, which is depicted in FIG. 22C. In the mono- and diprotonated forms, nicotine is less volatile than the unprotonated form.

FIG. 22D is a graphical representation illustrating the relationship between pH and the relative fraction of each species of FIGS. 22A-22C in solution. As shown in FIG. 22D, the relative dominance of the unprotonated form in a solution tends to shift in favor of the protonated forms around a pH of 8. At moderately acidic to slightly basic pH values in the approximately 3.5 to approximately 8 range, the monoprotonated form is the dominant species in solution. And, at pH values of approximately 3.5 and lower, the diprotonated form is the dominant species in solution. In this regard, it is contemplated that an acid can be added to unprotonated nicotine to adjust the pH and increase the ratio of protonated nicotine species, which includes both monoprotonated and diprotonated species, in solution.

FIG. 23 is a graphical representation illustrating the relationship between total nicotine concentration and an unprotonated fraction of total nicotine and how that relationship can inform a sensory experience. As a basic compound, nicotine in its unprotonated form is understood to yield a harsh sensory experience at higher nicotine concentrations. As illustrated in FIG. 23, the harshness of the sensory experience can be mitigated when the fraction of unprotonated nicotine is reduced relative to the overall amount of nicotine present in solution.

Figure 24:
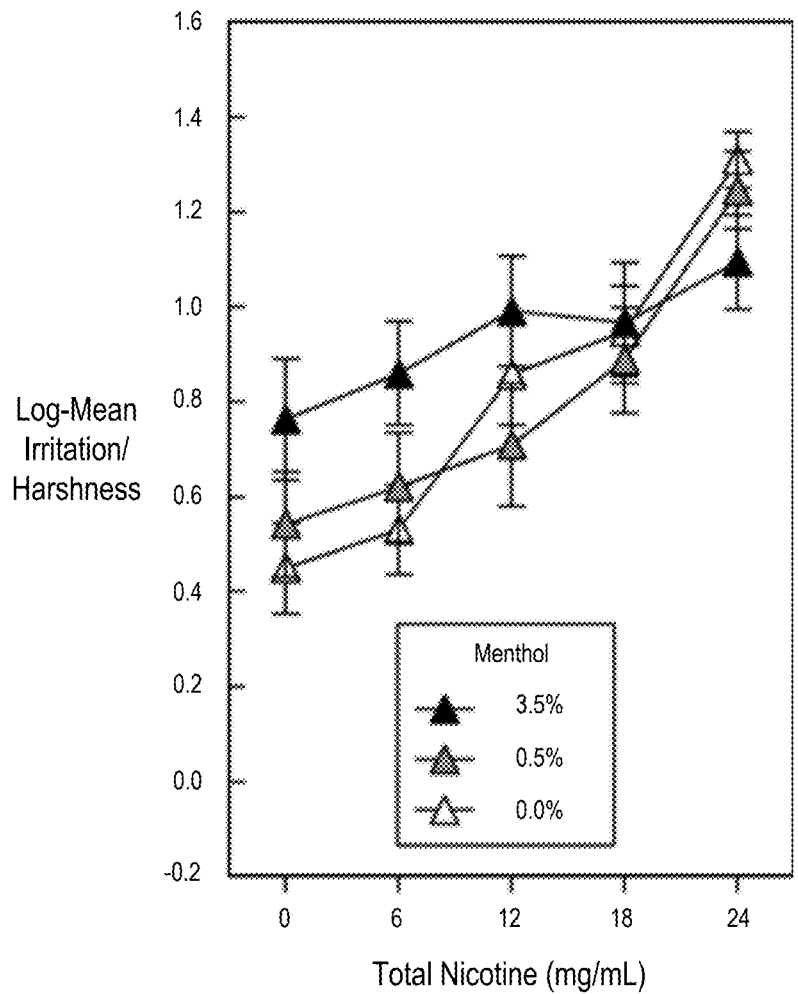
FIG. 24 is a graphical representation illustrating a harshness measurement of a menthol-containing formulation as a function of total nicotine concentration.

FIG. 24 is a graphical representation illustrating a harshness measurement of a menthol-containing formulation as a function of total nicotine concentration. It is contemplated that a harsh sensory experience arising from nicotine inhalation can be further mitigated by the inclusion of menthol in solution. As depicted in FIG. 23, a menthol concentration of approximately 3.5% can reduce the irritation/harshness sensory effect at higher nicotine concentrations (such as at nicotine concentrations of 18 mg/mL or greater). This mitigation of the harshness effect can be coupled with other favorable characteristics of menthol, including a strong cooling sensation and strong overall intensity.

With reference to FIGS. 23 and 24, it is contemplated that an overall sensorial appeal of aerosolizable and inhalable aqueous formulations can be informed by considerations of one or more of total nicotine amount, a ratio of unprotonated nicotine relative to the total nicotine amount, and menthol.

In some contemplated embodiments, an aqueous formulation for aerosolizing and inhaling using electronic devices includes a total nicotine concentration of approximately 20 mg/mL in an aqueous solution. To achieve a desired ratio of unprotonated nicotine to protonated nicotine (including monoprotonated and diprotonated forms) in such a formulation, an acid can be added until an unprotonated fraction of approximately 0.2 to approximately 0.35 is achieved relative to the total nicotine amount. With further reference to FIG. 23, a zone of interest for such a formulation is reflected by the portion of the graphical representation marked by A, with preference given to the portion marked by B. When considered in light of the graphical representation of FIG. 22D, a target pH for achieving an unprotonated fraction of approximately 0.2 to approximately 0.35 falls between the 6 to 8 range. For example, a species that includes approximately 0.3 unprotonated fraction may require a target pH of approximately 7.5, which is depicted in FIG. 22D with a line marked by C. Additionally, it is contemplated that menthol can be included in the formulation to enhance the sensory experience and reduce harshness.

In other contemplated embodiments, an aqueous formulation for aerosolizing and inhaling using electronic devices includes a saline component, a nicotine component, an acid component, and, optionally, one or both of a menthol component and an ethanol component. Contemplated mass percent ranges for each component for such a formulation include: a saline component having approximately 30% by mass to approximately 99.998% by mass of the solution; a nicotine component having approximately 0.001% by mass to approximately 5% by mass of the solution; an acid component having approximately 0.001% by mass to approximately 25% by mass of the solution; a menthol component having 0% by mass to approximately 15% by mass of the solution; and an ethanol component having 0% by mass to approximately 25% by mass of the solution.

It is contemplated that the saline component is a safe, aqueous solution that resembles or approximates a physiologically normal solution. One preferred form of saline for use as a saline component in the aqueous formulation is an isotonic saline, such as 0.9% NaCl saline solution. It is further contemplated that hypotonic or hypertonic saline can be used. In this regard, a saline solution may fall within a range of approximately 0.001% to approximately 7.5% NaCl saline solution. In still other contemplated embodiments, water is used in place of a saline component.

The acid component functions to reduce the fraction of unprotonated nicotine relative to the overall nicotine amount. One preferred acid for use as an acid component in the aqueous formulation is lactic acid. Other contemplated acids include, but are not limited to, benzoic acid, malic acid, tartaric acid, salicylic acid, levulinic acid, and hydrochloric acid.

As discussed above, menthol can optionally be included in the aqueous formulation to enhance the sensory experience and reduce harshness. Other flavorants and components are likewise contemplated in addition to (or in place of) menthol.

It is contemplated that ethanol can optionally be included in the aqueous formulation as a surfactant or as a cosolvent. Other contemplated cosolvents include, but are not limited to, propylene glycol and glycerin.

One specific contemplated formulation in accordance with the above-described features includes: a 0.9% NaCl saline component having approximately 93.486% by mass of the solution; a nicotine component having approximately 2% by mass of the solution; a lactic acid component having approximately 4.477% by mass of the solution; and a menthol component having approximately 0.037% by mass of the solution.

Figure 25:
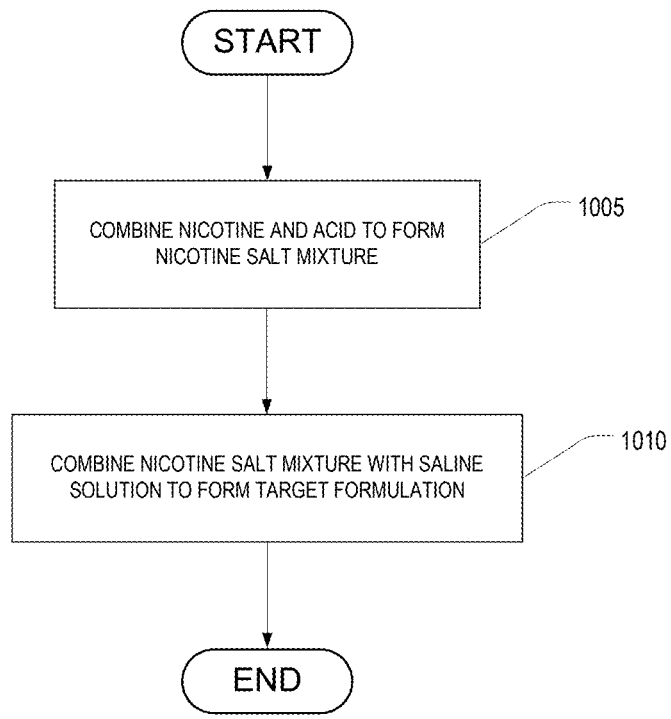
FIG. 25 is a flowchart illustrating a method of preparing an aqueous formulation, in accordance with one or more aspects of the invention, which includes a saline component, a nicotine component, and an acid component.

FIG. 25 is a flowchart illustrating a method 1000 of preparing an aqueous formulation, in accordance with one or more aspects of the invention, which includes a saline component, a nicotine component, and an acid component. In a first step 1005, the nicotine component and the acid component are combined to form a nicotine salt mixture. In embodiments where the acid component includes a lactic acid, the nicotine component and the acid component combine to form a nicotine lactate mixture. In a second step 1010, the nicotine salt mixture is combined with the saline solution to create the target formulation for aerosolizing and inhaling using electronic devices.

Figure 26:
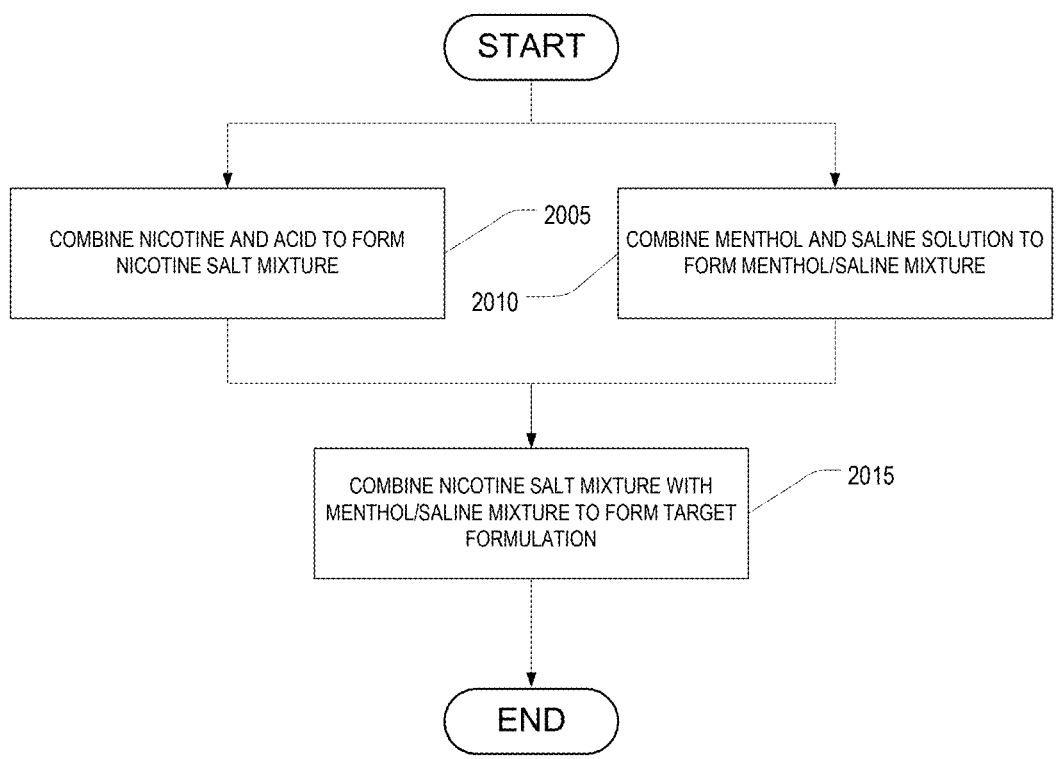
FIG. 26 is a flowchart illustrating a method of preparing an aqueous formulation, in accordance with one or more aspects of the invention, which includes a saline component, a nicotine component, an acid component, and a menthol component.

FIG. 26 is a flowchart illustrating a method 2000 of preparing an aqueous formulation, in accordance with one or more aspects of the invention, which includes a saline component, a nicotine component, an acid component, and a menthol component. In a first step 2005, the nicotine component and the acid component are combined to form a nicotine salt mixture. In embodiments where the acid component includes a lactic acid, the nicotine component and the acid component combine to form a nicotine lactate mixture. In a second step 2010, the menthol component is separately combined with the saline component to form a menthol/saline mixture. Then, in a third step 2015, the nicotine salt mixture from the first step 2005 is combined with the menthol/saline mixture from the second step 2010 to create the target formulation for aerosolizing and inhaling using electronic devices.

Figure 27:
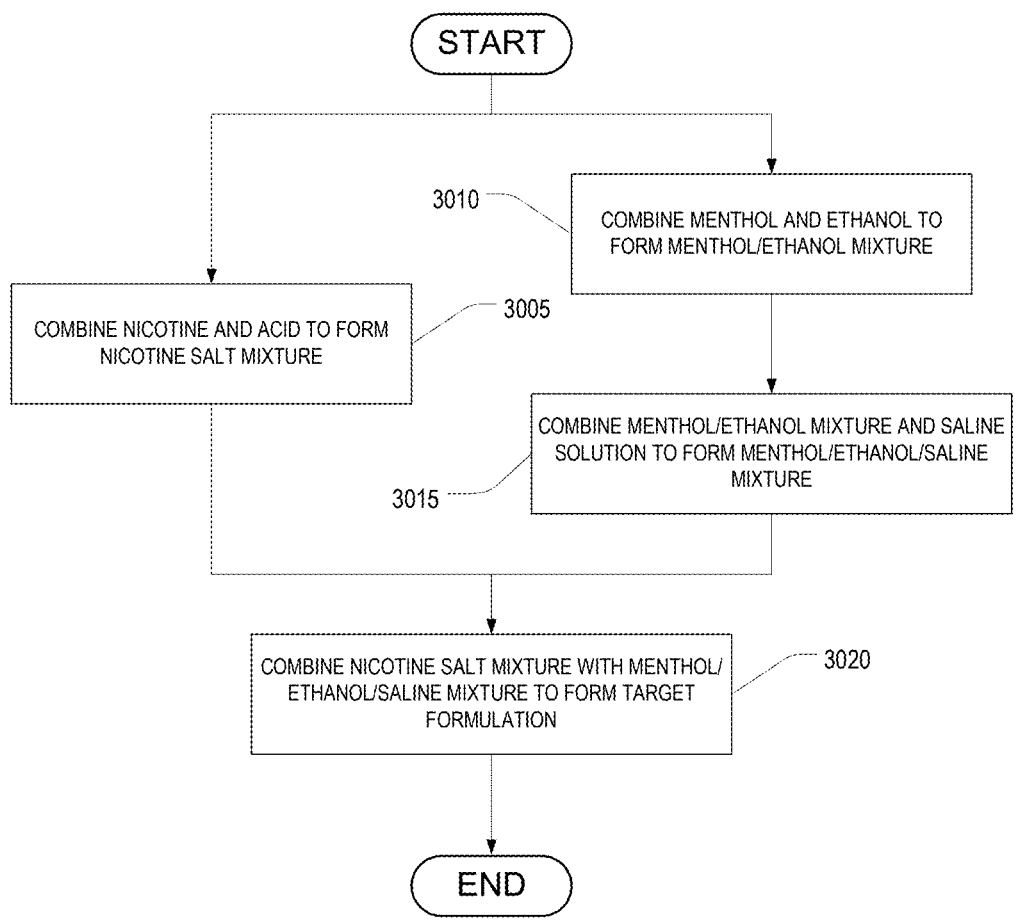
FIG. 27 is a flowchart illustrating a method of preparing an aqueous formulation, in accordance with one or more aspects of the invention, which includes a saline component, a nicotine component, an acid component, a menthol component, and an ethanol component.

FIG. 27 is a flowchart illustrating a method 3000 of preparing an aqueous formulation, in accordance with one or more aspects of the invention, which includes a saline component, a nicotine component, an acid component, a menthol component, and an ethanol component. In a first step 3005, the nicotine component and the acid component are combined to form a nicotine salt mixture. In embodiments where the acid component includes a lactic acid, the nicotine component and the acid component combine to form a nicotine lactate mixture. In a second step 3010, the menthol component is separately combined with the ethanol component to form a menthol/ethanol mixture. As discussed above, it is contemplated that the ethanol component can be included as a surfactant or as a cosolvent. In this regard, it is noted that components added to the solution that are beyond the solubility limit of menthol may require a surfactant. In this regard, it is contemplated that use of a surfactant allows components above a solubility limit to be included in a mixture through formation of an emulsion. Surfactant molecules interrelate to form a structure capable of encapsulating an otherwise insoluble component. In a third step 3015, the menthol/ethanol mixture from the second step 3010 is combined with the saline component to create a menthol/ethanol/saline mixture. Then, in a fourth step 3020, the nicotine salt mixture from the first step 3005 is combined with the menthol/ethanol/saline mixture from the third step 3015 to create the target formulation for aerosolizing and inhaling using electronic devices.

In still other contemplated embodiments, an aqueous formulation for aerosolizing and inhaling using electronic devices includes a saline component, a nicotine component, an acid component, and, optionally, any one or any combination of a menthol component, an ethanol component, and a surfactant component. Contemplated mass percent ranges for each component for such a formulation include: a saline component having approximately 35% by mass to approximately 99.998% by mass of the solution; a nicotine component having approximately 0.001% by mass to approximately 5% by mass of the solution; an acid component having approximately 0.001% by mass to approximately 25% by mass of the solution; a menthol component having 0% by mass to approximately 15% by mass of the solution; an ethanol component having 0% by mass to approximately 10% by mass of the solution; and a surfactant component having 0% by mass to approximately 10% by mass of the solution.

It is contemplated that the saline component is a safe, aqueous solution that resembles or approximates a physiologically normal solution. One preferred form of saline for use as a saline component in the aqueous formulation is an isotonic saline, such as 0.9% NaCl saline solution. It is further contemplated that hypotonic or hypertonic saline can be used. In this regard, a saline solution may fall within a range of approximately 0.001% to approximately 7.5% NaCl saline solution. In still other contemplated embodiments, water is used in place of a saline component.

The acid component functions to reduce the fraction of unprotonated nicotine relative to the overall nicotine amount. One preferred acid for use as an acid component in the aqueous formulation is lactic acid. Other contemplated acids include, but are not limited to, benzoic acid, malic acid, tartaric acid, salicylic acid, levulinic acid, and hydrochloric acid.

As discussed above, menthol can optionally be included in the aqueous formulation to enhance the sensory experience and reduce harshness. Other flavorants and components are likewise contemplated in addition to (or in place of) menthol.

It is contemplated that ethanol can optionally be included in the aqueous formulation as a surfactant or as a cosolvent. Other contemplated cosolvents include, but are not limited to, propylene glycol and glycerin.

The surfactant component can help to reduce the surface tension of the liquid solution in which it is dissolved. Surfactant molecules in solution can group together to form a micelle or liposomal structure to encapsulate target ingredients or components in solution. In this regard, an emulsion or nanoemulsion can be formed so that otherwise insoluble components can be encapsulated by surfactants and remain part of the mixture. In at least some embodiments, it is contemplated that a microfluidics approach (using a microfluidics machine) can be utilized to form a nanoemulsion through the interaction of liquid streams in defined microchannels. For additional discussion of surfactants as encapsulating agents for pulmonary delivery of specific ingredients or components to the alveolar lung by inhalation, reference is made to the '679 application.

It is contemplated that surfactants for use in an aqueous formulation in accordance with one or more aspects of the present invention may include, but are not limited to: high purity polyoxyethylene sorbitan monooleate (also known by its trade name, SUPER REFINED® Polysorbate 80); polyoxyethylene sorbitan monooleate; (also known by its trade name, TWEEN® Polysorbate 80); polyoxyethylene sorbitan monostearate (also known by its trade name TWEEN® Polysorbate 60); polyoxyethylene sorbitan monopalmitate (also known by its trade name TWEEN® Polysorbate 40); polyoxyethylene sorbitan monolaurate (also known by its trade name TWEEN® Polysorbate 20); lecithin; dipalmitoylphosphatidylcholine (DPPC); 1,2-distearoyl-sn-glycero-3-phosphocholine (DSPC); sorbitan monostearate (also known by its trade name SPAN 60); sorbitan monopalmitate (also known by its trade name SPAN 40); and a poloxamer (such as poloxamer 188 or poloxamer 447). It is further contemplated that an aqueous formulation in accordance with one or more aspects of the present invention can include a single surfactant or can include multiple surfactants.

One specific contemplated formulation in accordance with the above-described features includes: a 0.9% NaCl saline component having approximately 91.291% by mass of the solution; a nicotine component having approximately 2.001% by mass of the solution; a lactic acid component having approximately 4.479% by mass of the solution; a menthol component having approximately 2.229% by mass of the solution; an ethanol component having approximately 1.758% by mass of the solution; and a TWEEN® Polysorbate 80 surfactant component having approximately 2.377% by mass of the solution.

Figure 28:
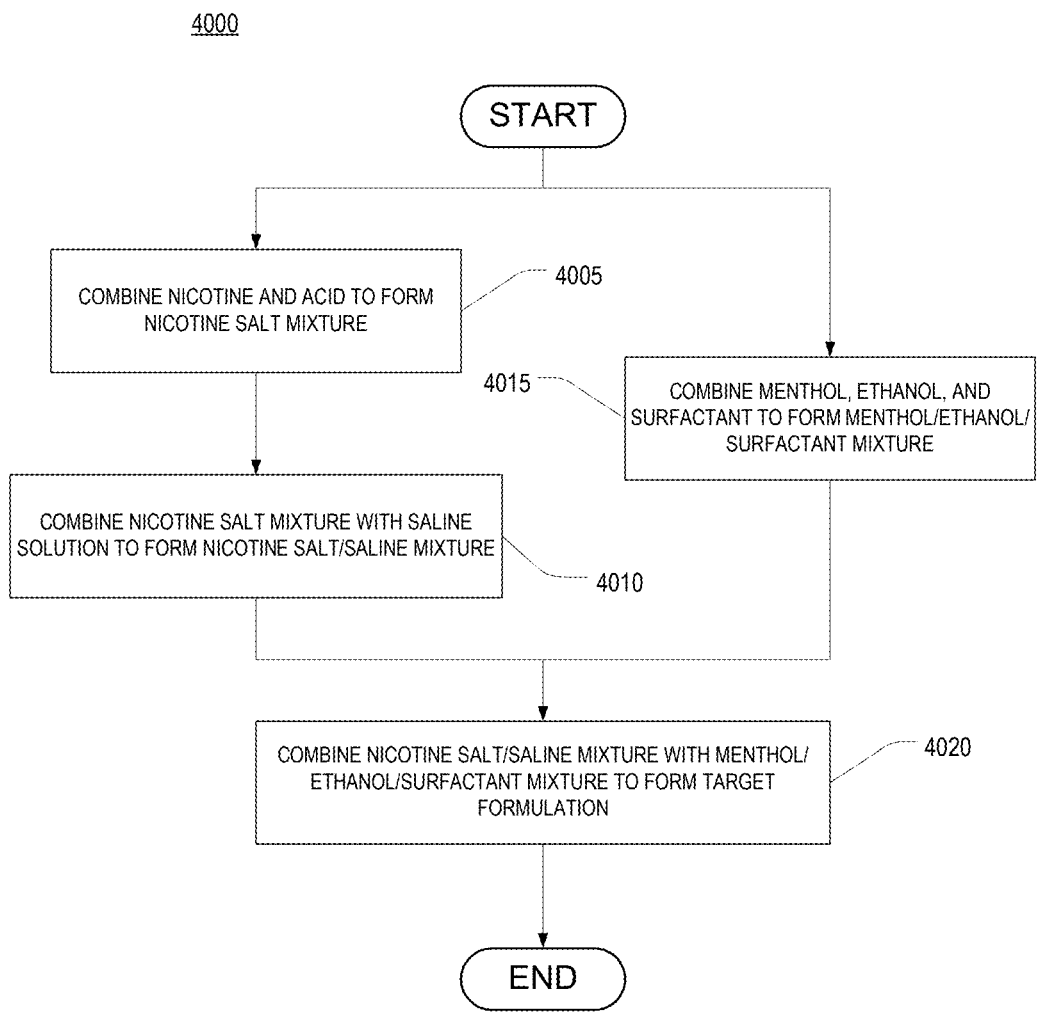
FIG. 28 is a flowchart illustrating a method of preparing an aqueous formulation, in accordance with one or more aspects of the invention, which includes a saline component, a nicotine component, an acid component, a menthol component, an ethanol component, and a surfactant component.
Figure 29:
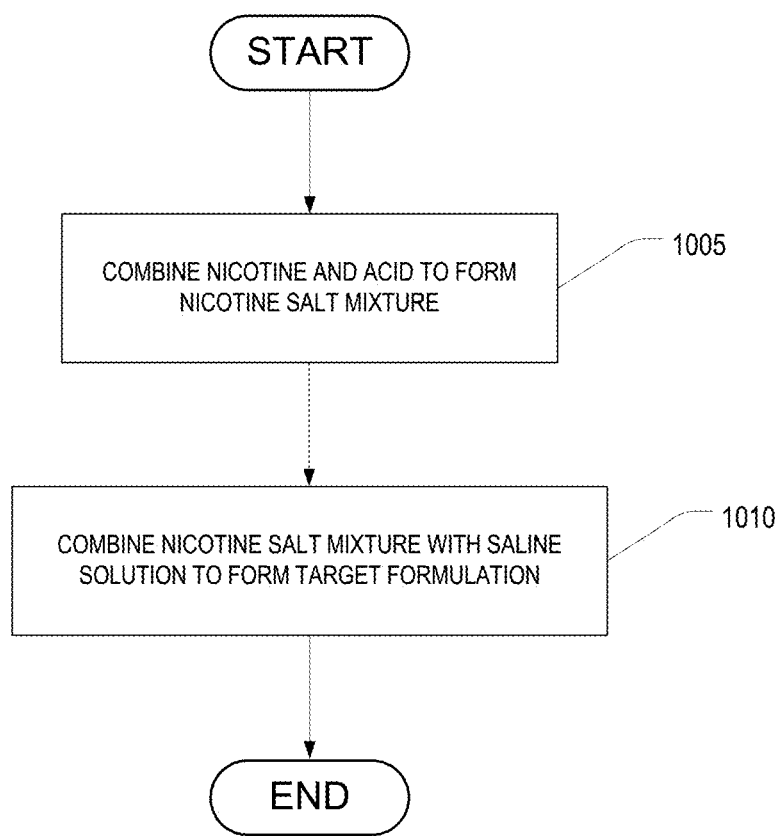
Figure 30:
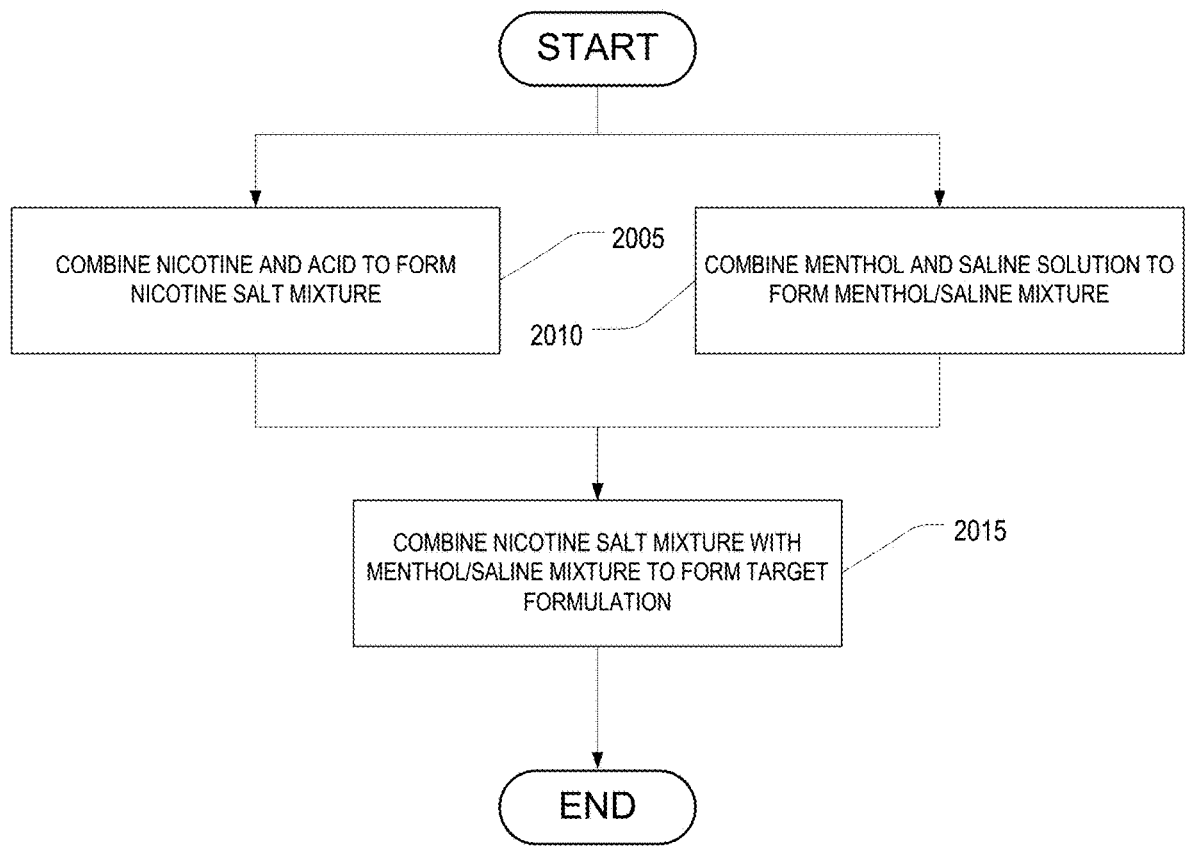
Figure 31:
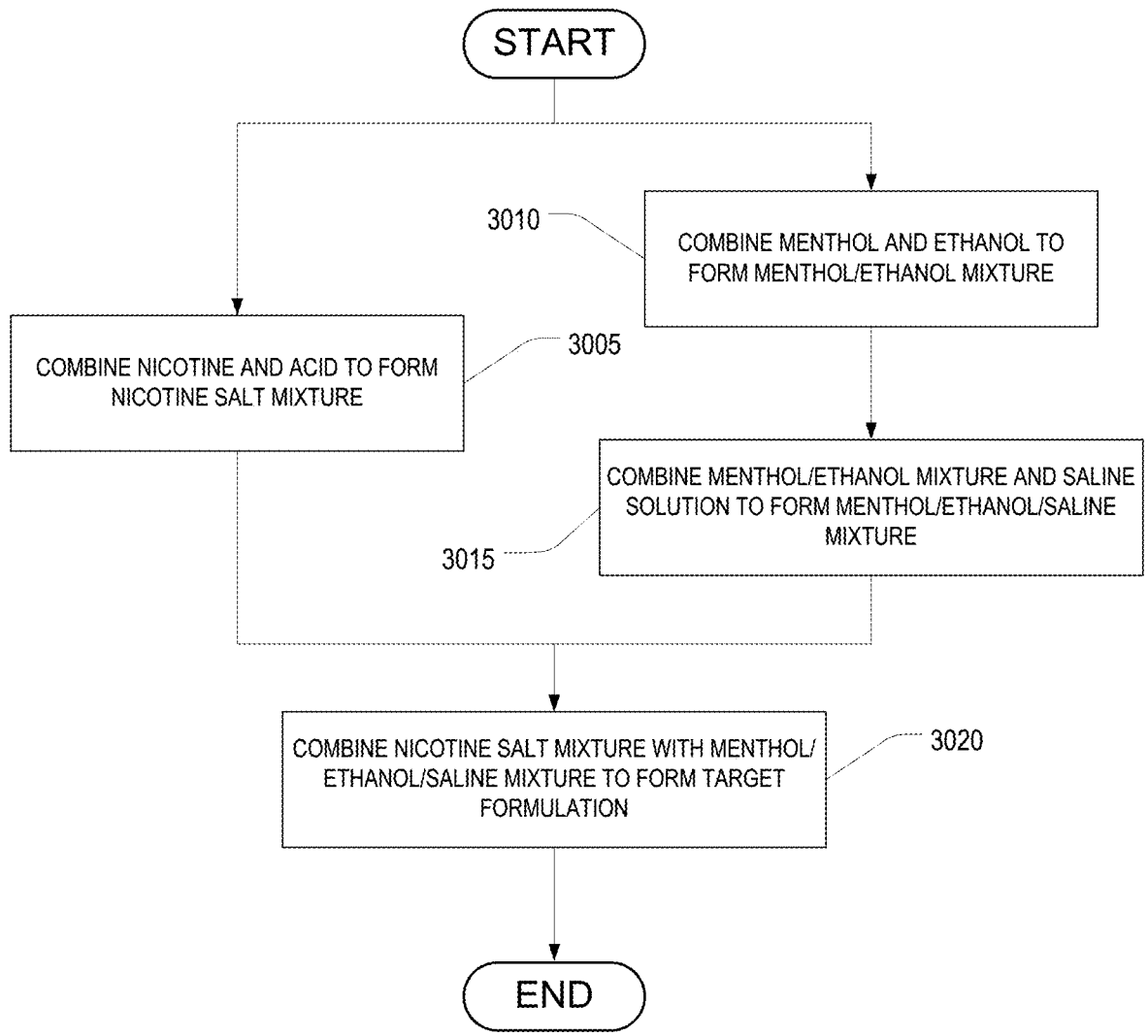
Figure 32:
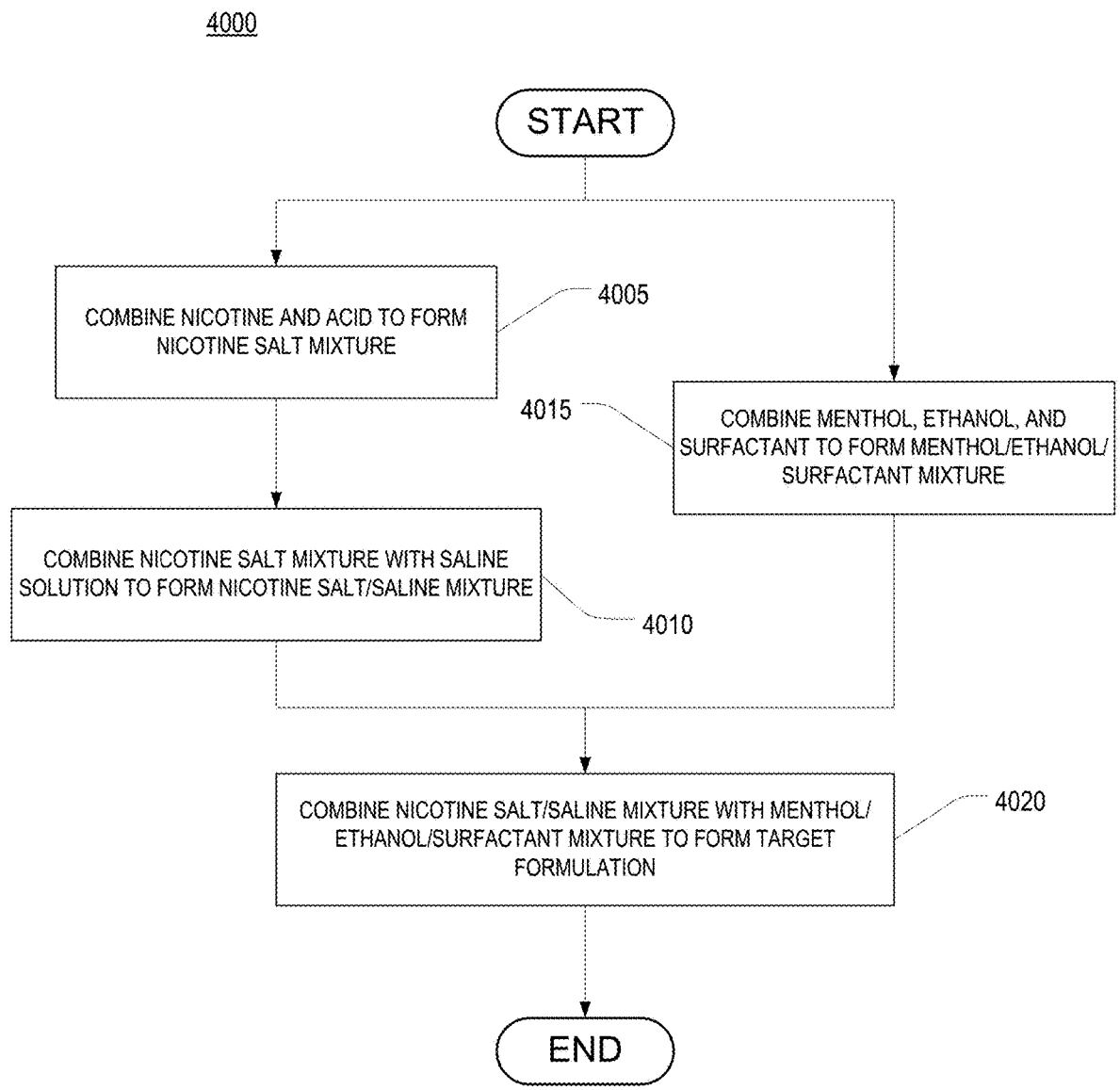

FIG. 28 is a flowchart illustrating a method 4000 of preparing an aqueous formulation, in accordance with one or more aspects of the invention, which includes a saline component, a nicotine component, an acid component, a menthol component, an ethanol component, and a surfactant component. In a first step 4005, the nicotine component and the acid component are combined to form a nicotine salt mixture. In embodiments where the acid component includes a lactic acid, the nicotine component and the acid component combine to form a nicotine lactate mixture. Then, in a second step 4010, the nicotine salt mixture from the first step 4005 is combined with the saline component to create a nicotine salt/saline mixture. In a third step 4015, the menthol component, the ethanol component, and the surfactant component are separately combined to form a menthol/ethanol/surfactant mixture. In contemplated embodiments, the surfactant component includes TWEEN® Polysorbate 80. Additionally, as discussed above, it is contemplated that the ethanol component can be included as a surfactant or as a cosolvent. In this regard, it is noted that components added to the solution that are beyond the solubility limit of menthol may require a surfactant. Then, in a fourth step 4020, the nicotine salt/saline mixture from the second step 4010 is combined with the menthol/ethanol/surfactant mixture from the third step 4015 to create the target formulation for aerosolizing and inhaling using electronic devices. When a surfactant, such as TWEEN® Polysorbate 80, is used in the aqueous formulation, the sequence of preparation steps can help to prevent a constituent from precipitating as a solid during mixing of components. In particular, where menthol and a surfactant are both used in the aqueous formulation, combining the nicotine component and the acid component separately from the menthol component and the surfactant component helps to prevent menthol from precipitating out of the system when the separately combined components are mixed together to create the target formulation.

As discussed above, pH level measurements can be used to help inform regarding the fraction of different nicotine species in solution. pH level can also function as a gauge for overall sensory experience upon aerosolizing and inhaling an aqueous formulation. In contemplated embodiments, a target pH range for providing a pleasant sensory experience to users places the pH measurement of an aqueous formulation from approximately 2 to approximately 7. In at least some embodiments, a target pH value within a range of approximately 2 to approximately 5 is preferred. Furthermore, in at least some embodiments, a target pH value of approximately 3.38 reflects a particularly favorable sensory experience that mitigates harshness that may arise at higher nicotine concentrations.

Based on the foregoing description, it will be readily understood by those persons skilled in the art that the invention has broad utility and application. Electronic devices of the invention can be utilized to deliver liquids comprising supplements, drugs, or therapeutically effective amounts of pharmaceuticals using an aerosol having particles of a size that can easily be inhaled. The aerosol can be used, for example, by a patient within the bounds of an inhalation therapy, whereby the liquid containing a supplement, therapeutically effective pharmaceutical, or drug reaches the patient's respiratory tract upon inhalation. Desired compounds such as nicotine, flavoring, and supplements like B12, can be received by a person through inhalation without the toxic byproducts like formaldehyde—a recognized Group 1 Carcinogen for cancer—that is currently being created during heating in conventional vapes. Electronic devices of the invention further can be used in the marijuana industries, but only where legal, for delivery of cannabinoids and CBD oils and the like. Moreover, many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

It further will be appreciated from the foregoing that at least some preferred embodiments of the invention represent a portable, orientation-agnostic vibrating mesh nebulizer. It further will be appreciated from the foregoing that at least some preferred embodiments emit an aerosol that is—sensorially speaking—equivalent to vapor, i.e., not a mist but instead that which is generated by traditional vapes, thereby providing an enjoyable consumer product for those who are accustomed to vaping.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. An electronic device for producing an aerosol for inhalation by a person, comprising:
   (a) a cartridge assembly; and
   (b) a handheld base assembly;
   (c) wherein the cartridge assembly and the handheld base assembly are configured to removably couple together; and
   (d) wherein the cartridge assembly comprises,
      (i) a mouthpiece; and
      (ii) a cartridge comprising a container for containing liquid to be aerosolized and a mesh assembly located on an exterior of the cartridge on top of a lip of a mouth of the container, the mesh assembly comprising a mesh material and a piezoelectric material that vibrates when actuated whereby an aerosol is produced such that the aerosol may be inhaled through the mouthpiece;
      (iii) wherein the mouthpiece is attached to the cartridge in covering relation to the mesh assembly such that the aerosol produced by the mesh assembly may be inhaled through an opening in the mouthpiece, the mesh assembly being held in tension seated on top of the lip of the mouth of the container by compressed engagement with an O-ring resulting from the attachment of the mouthpiece to the cartridge; and
   (e) wherein the cartridge assembly further comprises a wick comprising a lengthwise channel formed in an exterior surface of the wick and located within and extending between a bottom of the container and the mouth of the container, and wherein the wick is retained in constant contact with the mesh assembly by protuberances proximate the bottom of the container that surround the first end of the wick in a discontinuous circular pattern and receive the end of the wick in frictional fit therewith.

2. The electronic device of claim 1, wherein the handheld base assembly comprises circuitry and a power supply for actuating the mesh assembly.

3. The electronic device of claim 1, wherein the cartridge assembly and handheld base assembly are configured to magnetically couple together.

4. The electronic device of claim 3, wherein the cartridge assembly magnetically mounts onto an end of the handheld base assembly.

5. The electronic device of claim 1, wherein screws are utilized in effecting the attachment of the mouthpiece to the cartridge whereby a force by which the O-ring is held in the compressed engagement with the mesh assembly is adjustable.

6. The electronic device of claim 1, wherein the first end of the wick is secured by four protuberances that surround the first end of the wick in a discontinuous circular pattern.

7. A cartridge assembly containing a liquid for producing an aerosol for inhalation by a person, comprising:
   (a) a mouthpiece; and
   (b) a cartridge comprising a container containing the liquid to be aerosolized and a mesh assembly located on an exterior of the cartridge on top of a lip of a mouth of the container, the mesh assembly comprising a mesh material and a piezoelectric material that vibrates when actuated whereby an aerosol is produced such that the aerosol may be inhaled through the mouthpiece;
   (c) wherein the mouthpiece is attached to the cartridge in covering relation to the mesh assembly such that the aerosol produced by the mesh assembly may be inhaled through an opening in the mouthpiece, the mesh assembly being held in tension seated on top of the lip of the mouth of the container by compressed engagement with an O-ring resulting from the attachment of the mouthpiece to the cartridge; and
   (d) wherein the cartridge assembly further comprises a wick comprising a lengthwise channel formed in an exterior surface of the wick and located within and extending between a bottom of the container and the mouth of the container, and wherein the wick is retained in constant contact with the mesh assembly by protuberances proximate the bottom of the container that surround the first end of the wick in a discontinuous circular pattern and receive the end of the wick in frictional fit therewith.

8. The cartridge assembly of claim 7, wherein screws are utilized in effecting the attachment of the mouthpiece to the cartridge whereby a force by which the O-ring is held in the compressed engagement with the mesh assembly is adjustable.

9. The cartridge assembly of claim 7, wherein the first end of the wick is secured by four protuberances that surround the first end of the wick in a discontinuous circular pattern.

10. The cartridge assembly of claim 7, the liquid comprises an aqueous formulation, the aqueous formulation comprising:
    a saline component;
    an acid component, wherein the acid component includes a lactic acid; and
    a nicotine component.

11. The cartridge assembly of claim 10, wherein the acid component further includes one or more of benzoic acid, malic acid, tartaric acid, salicylic acid, levulinic acid, and hydrochloric acid.

12. The cartridge assembly of claim 10, wherein a pH value of the aqueous formulation measures between approximately 2 and approximately 5.

13. The cartridge assembly of claim 10, further comprising a menthol component.

14. The cartridge assembly of claim 13, further comprising an ethanol component.

15. The cartridge assembly of claim 13, further comprising a surfactant component, wherein the surfactant component includes one or more different surfactants, wherein the surfactant component includes one or more of polyoxyethylene sorbitan monooleate, polyoxyethylene sorbitan monostearate, polyoxyethylene sorbitan monolaurate, lecithin, and a poloxamer.

* * * * *